United States Patent
Bialkowski et al.

(10) Patent No.: US 10,793,403 B2
(45) Date of Patent: *Oct. 6, 2020

(54) METHOD OF ACTIVELY CONTROLLING WINCH SWING VIA MODULATED UPTAKE AND RELEASE

(71) Applicant: Wing Aviation LLC, Mountain View, CA (US)

(72) Inventors: Joshua John Bialkowski, San Mateo, CA (US); John Roberts, Mountain View, CA (US); Abraham Bachrach, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/955,388

(22) Filed: Apr. 17, 2018

(65) Prior Publication Data

US 2018/0237276 A1 Aug. 23, 2018

Related U.S. Application Data

(63) Continuation of application No. 15/222,150, filed on Jul. 28, 2016, now Pat. No. 9,981,834, which is a
(Continued)

(51) Int. Cl.
*B66D 1/48* (2006.01)
*B64C 39/02* (2006.01)
(Continued)

(52) U.S. Cl.
CPC ............ *B66D 1/485* (2013.01); *B64C 39/024* (2013.01); *B64D 1/22* (2013.01); *B66C 13/06* (2013.01);
(Continued)

(58) Field of Classification Search
CPC .... B64D 1/00; B64D 1/22; B64D 9/00; B64C 2201/128; B66C 13/04; B66C 13/06;
(Continued)

(56) References Cited

U.S. PATENT DOCUMENTS 3,756,543 A 9/1973 Fowler et al.
3,833,189 A 9/1974 Fowler et al.
(Continued)

OTHER PUBLICATIONS

Bisgaard et al., "Swing Damping for Helicopter Slung Load Systems using Delayed Feedback," American Institute of Aeronautics and Astronautics, 2009, pp. 1-11.
(Continued)

*Primary Examiner* — Joseph W Sanderson
(74) *Attorney, Agent, or Firm* — McDonnell Boehnen Hulbert & Berghoff LLP

(57) ABSTRACT

An unmanned aerial vehicle (UAV) including a winch system, wherein the winch system includes a single winch line, wherein a payload is suspended from a first end of the winch line, and the winch system is controllable to vary the rate of ascent of the payload to the UAV, and a control system including a processor and program instructions stored in a non-transitory computer readable medium and executable by the processor to control the winch, the control system configured to (a) receive data regarding oscillations of the payload, and (b) operate the winch system to vary a retraction rate of the winch line to damp oscillations of the payload during ascent of the payload to the UAV.

9 Claims, 14 Drawing Sheets

Related U.S. Application Data continuation of application No. 14/281,846, filed on May 19, 2014, now Pat. No. 9,422,139.

(51) Int. Cl.
*B66C 13/06* (2006.01)
*G05D 1/08* (2006.01)
*B64D 1/22* (2006.01)

(52) U.S. Cl.
CPC ...... *G05D 1/0858* (2013.01); *B64C 2201/128* (2013.01); *B64C 2201/141* (2013.01); *B64C 2201/146* (2013.01)

(58) Field of Classification Search
CPC ....... B66C 13/063; B66C 13/18; B66C 13/22; B66C 13/23
See application file for complete search history.

(56) References Cited

U.S. PATENT DOCUMENTS

| | | | |
|---|---|---|---|
| 3,838,836 A | 10/1974 | Asseo et al. | |
| 4,076,127 A | 2/1978 | Hupkes | |
| 5,722,618 A | 3/1998 | Jacobs et al. | |
| 5,788,186 A | 8/1998 | White | |
| 7,267,240 B2 | 9/2007 | Maurer | |
| 7,954,766 B2 | 6/2011 | Brainard et al. | |
| 8,622,336 B2 | 1/2014 | Brenner et al. | |
| 9,303,421 B1* | 4/2016 | Jennings | A63G 31/02 |
| 9,422,139 B1 | 8/2016 | Bialkowski et al. | |
| 9,981,834 B2* | 5/2018 | Bialkowski | B64C 39/024 |
| 2005/0224438 A1 | 10/2005 | Maurer et al. | |
| 2007/0200032 A1 | 8/2007 | Eadie et al. | |
| 2008/0210652 A1 | 9/2008 | Tavio Diaz et al. | |
| 2010/0222993 A1 | 9/2010 | Brainard et al. | |
| 2011/0192932 A1 | 8/2011 | Brenner et al. | |
| 2011/0218714 A1 | 9/2011 | Stantchev et al. | |

OTHER PUBLICATIONS

Hansson et al., "Control of a Quadrotor," Lund University, Department of Automatic Control, ISSN 0280-5316, ISSN LUTFD2/TFRT--5910--SE, May 2011, 113 pages.

Reddy et al., "Dynamic Simulation of a Helicopter Carrying a Slung Load," Proceedings of the International Congress on Modeling and Simulation, University of Canterbury, Christchurch, New Zealand, 2007, pp. 2740-2746.

Rudner et al., "Slung Load Control and User Interfaces for a Quadrotor Micro Air Vehicle," Final Thesis, Linkoping University, Department of Computer and Information Science, Jun. 13, 2011, pp. 9-110.

* cited by examiner

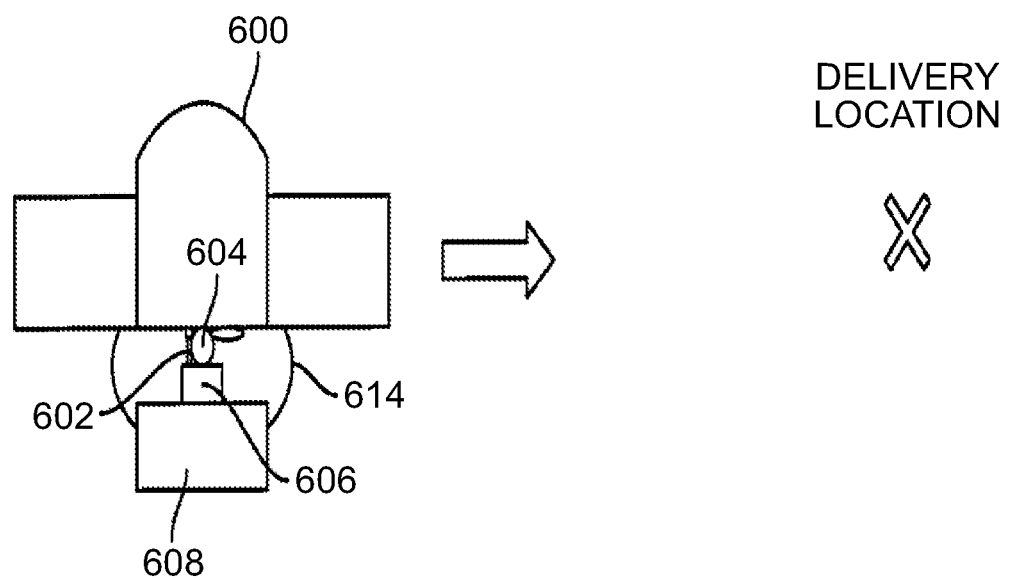
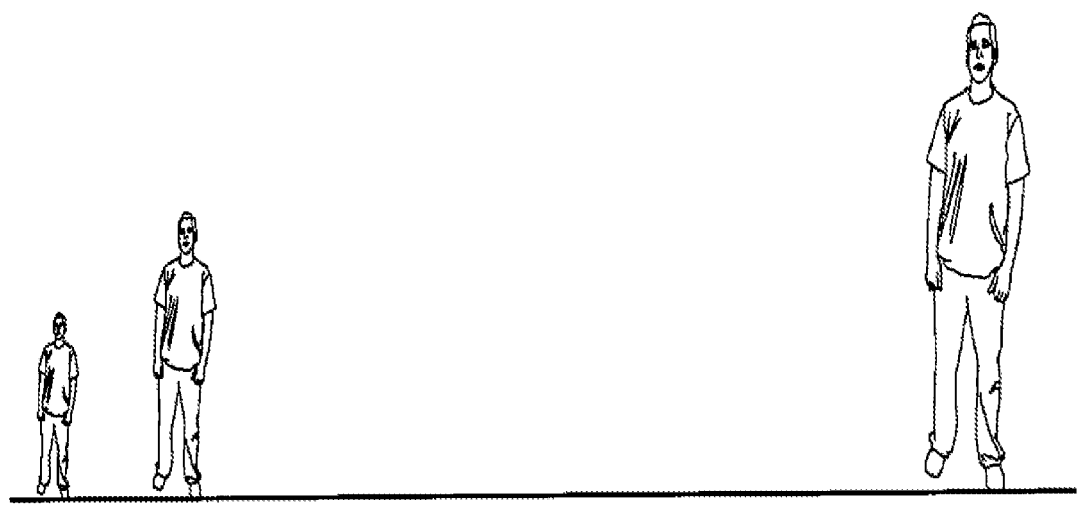
FIG. 6A

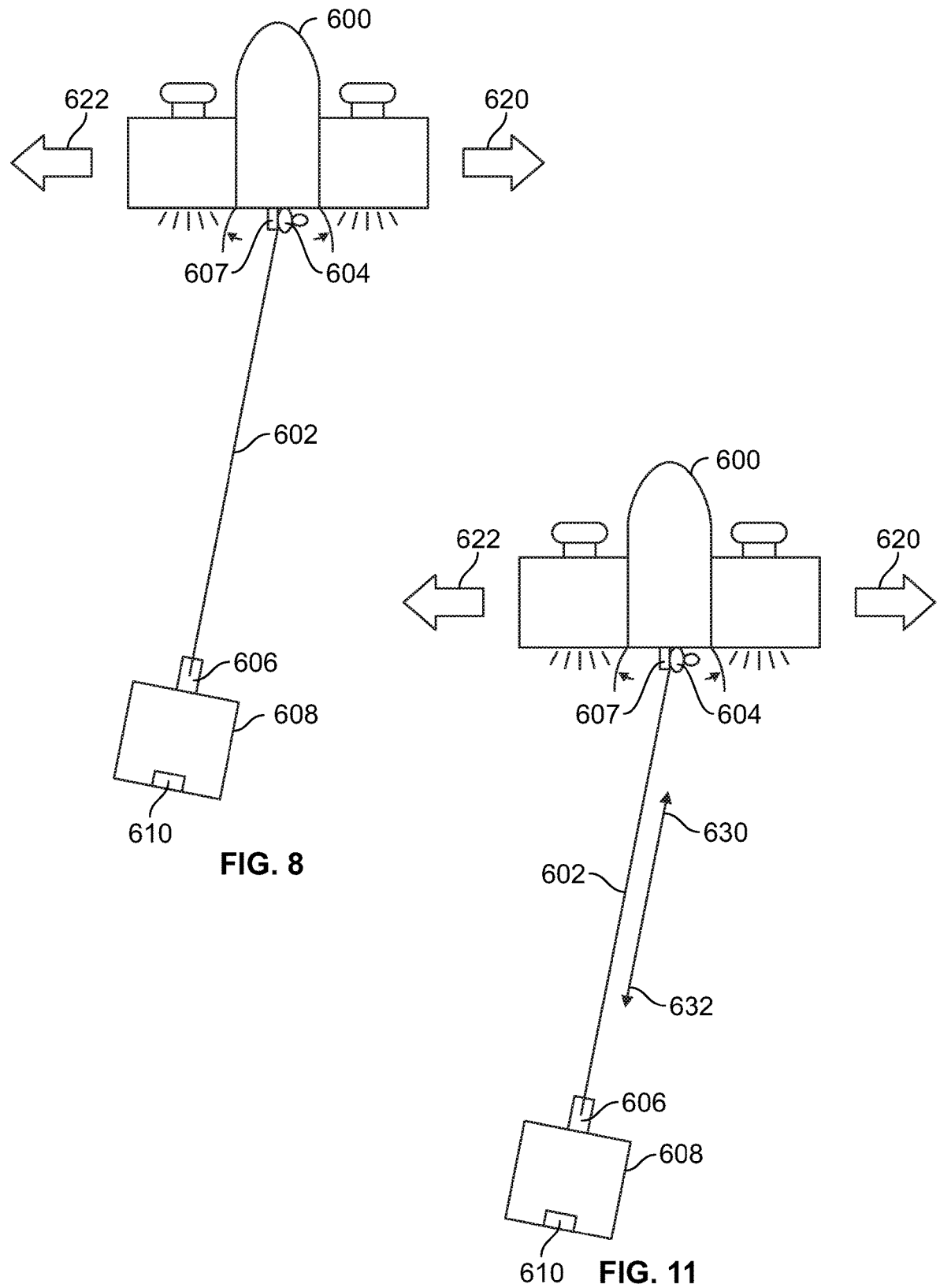

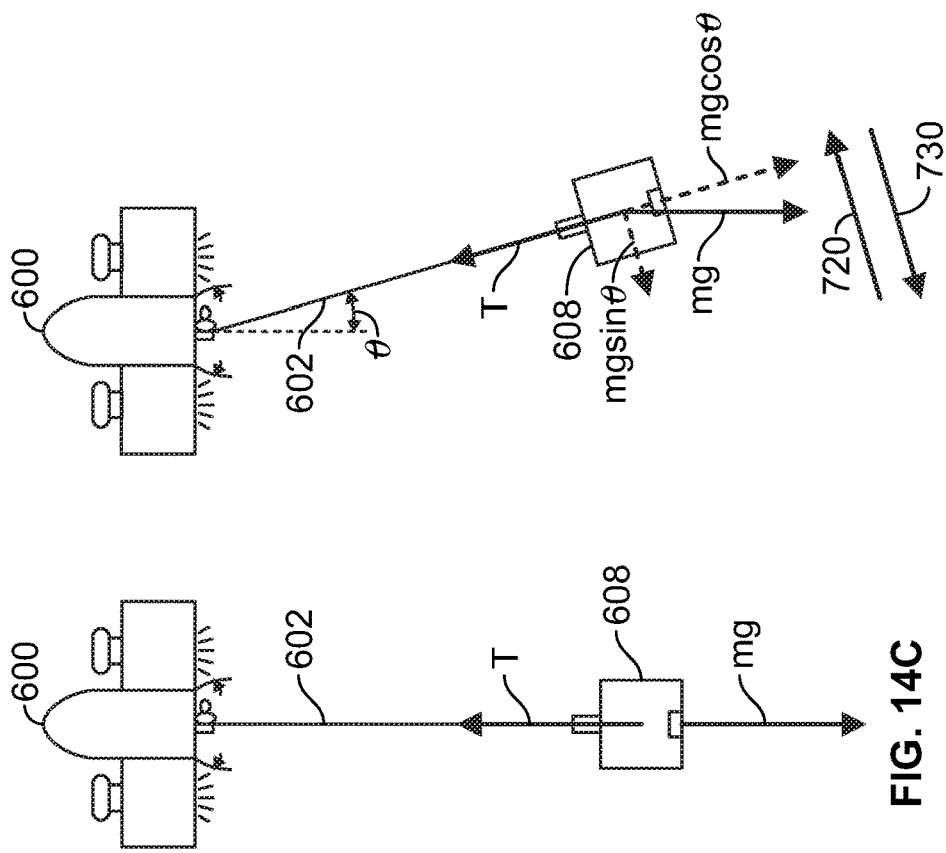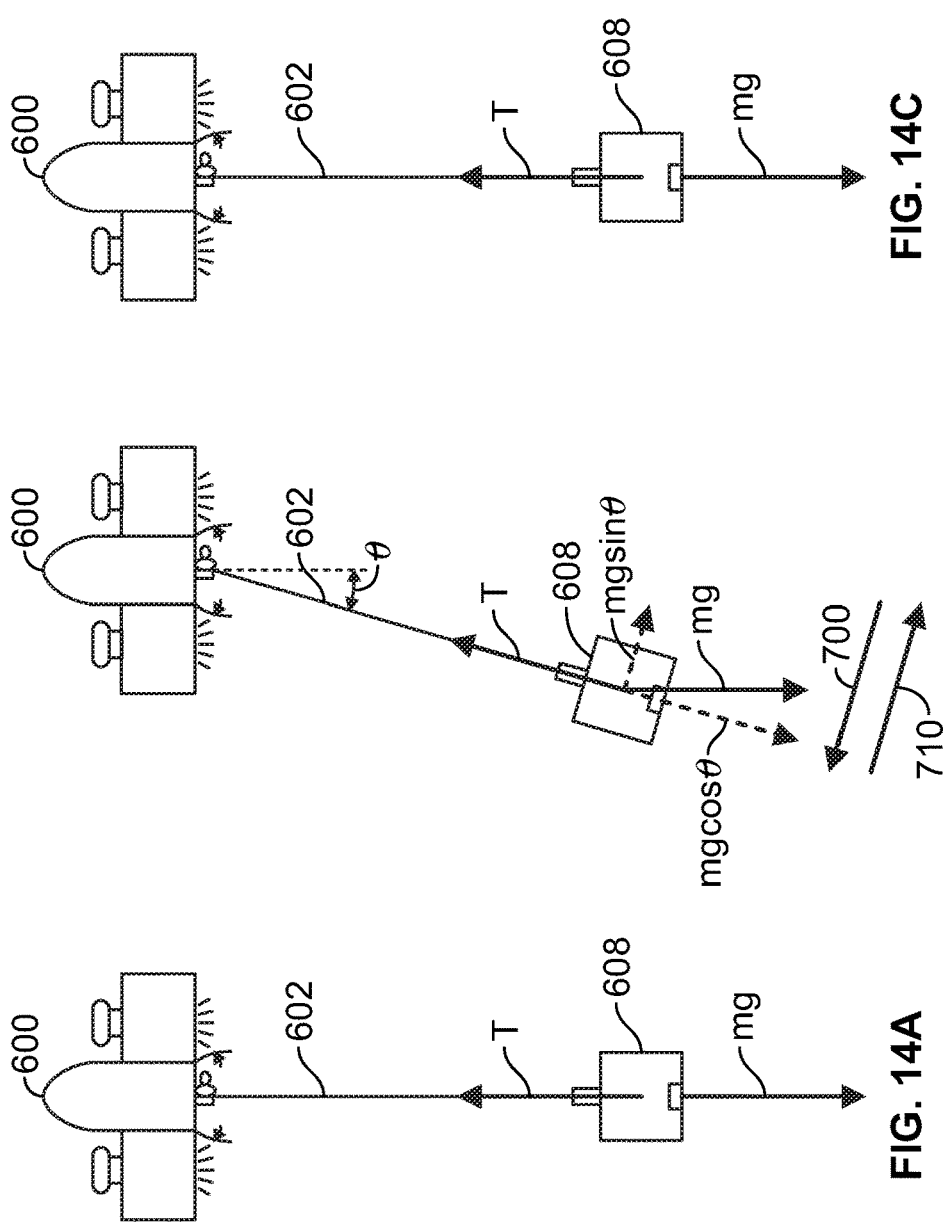

METHOD OF ACTIVELY CONTROLLING WINCH SWING VIA MODULATED UPTAKE AND RELEASE

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example embodiments may relate to or take the form of systems and methods controlling the pendulum-like motion of a payload extending beneath an unmanned aerial vehicle (UAV). In particular, example systems and methods may help to reduce or damp the oscillations of a payload extending beneath a hovering UAV. In an example embodiment, a UAV may include a winch system that is controllable to vary the rate at which a payload on a line is deployed towards the ground. An inertial measurement unit (IMU) positioned on or near the payload may provide measurements relating to the oscillations of the payload. During descent of the payload, a control system is configured to vary the rate at which the payload descends to reduce or damp the oscillations of the payload.

For example, the control system may cause the winch to unwind the line when the payload moves towards the bottom of the swing, and wind in the line (or reduce the rate of unwinding) as the payload moves from the bottom of the swing to the tops of the swing. Similarly, during ascent of the payload (or end of the winch line if the payload has been released), the control system may cause the winch to wind in line as the payloads moves towards the tops of the swing and reduce or stop the rate of winding in, or even unwind line as the payload moves towards the bottom of the swing. In this manner, the winch may be used to pump the payload during descent and/or ascent to reduce or damp the oscillations of the payload. For example, the rate of descent or ascent may be changed or reversed twice during a period of oscillation to reduce or damp the oscillations of the payload.

In one aspect, an example UAV may include a winch system, wherein the winch system includes a winch line having a first end that is secured to the payload, and wherein the winch system is controllable to vary the rate of descent of the payload, an inertial measurement unit positioned on the payload or on the first end of the winch line, wherein the inertial measurement unit is configured to measure oscillations of the payload, and a control system configured to (a) receive data from the IMU, (b) determine oscillations of the payload based on the data received from the IMU, and (c) operate the winch system to vary the deployment rate of the winch line so as to damp oscillations of the payload.

In another aspect, an example method is provided for controlling the oscillations of a payload during descent from an unmanned aerial vehicle (UAV), the UAV including a winch system positioned on the aerial vehicle, the winch system including a winch line secured to the payload and to the winch system, an inertial measurement unit positioned on the payload or an end of the winch line, and a control system positioned on the UAV, comprising the steps of operating the control system to control the rate of descent of the payload in response to measurements received from the inertial measurement unit, and operating the control system to unwind the winch line when the payload moves towards a bottom of a swing.

In a further aspect, an example method is provided for controlling the oscillations of a payload or end of a winch line during ascent to an unmanned aerial vehicle (UAV), the UAV including a winch system positioned on the aerial vehicle, the winch system including a winch line secured to the payload and to the winch system, an inertial measurement unit positioned on the payload or the end of the winch line, and a control system positioned on the UAV, comprising the steps of operating the control system to control the rate of ascent of the inertial measurement unit in response to measurements received from the inertial measurement unit; and operating the control system to wind in the winch line when the inertial measurement unit moves from a bottom of a swing towards a top of a swing.

In yet another aspect, an example system may include a control system configured with means for reducing or damping the oscillations of a payload during descent from a UAV, as well as means for reducing or damping the oscillations of a payload (or end of the winch if the payload has been released) during ascent to a UAV.

These as well as other aspects, advantages, and alternatives, will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 6A and 6B show a UAV that includes a payload delivery system, according to an example embodiment.

FIG. 8 is a simplified illustration of a UAV having a slung load, according to an example embodiment.

FIG. 11 is a simplified illustration of a UAV having a slung load, according to an example embodiment.

FIGS. 14A-D are simplified illustrations of a UAV showing the forces acting upon the payload during pendular motion, according to an example embodiment.

DETAILED DESCRIPTION

Figure 1:
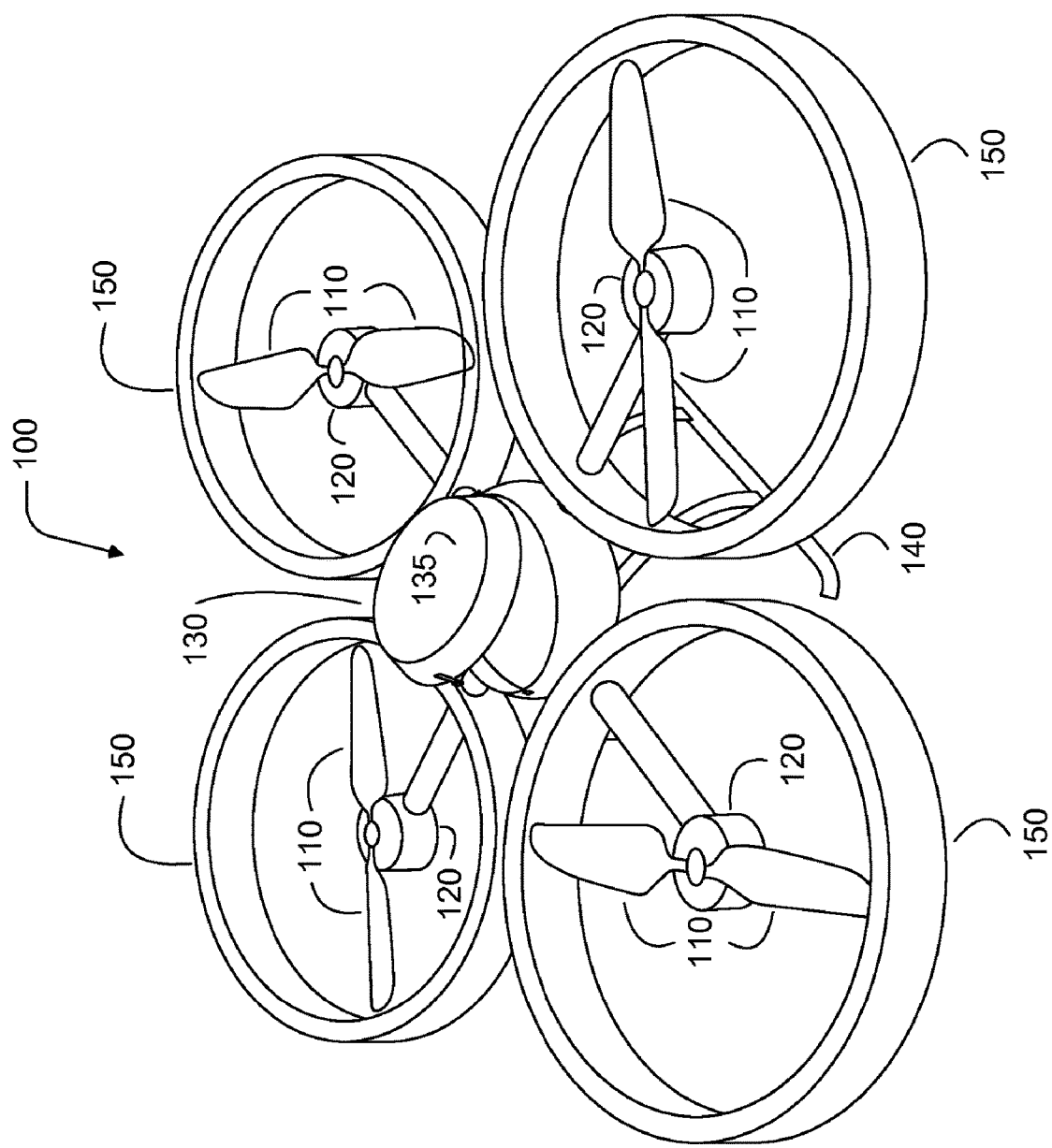
FIGS. 1, 2, 3A, and 3B are simplified illustrations of unmanned aerial vehicles, according to example embodiments.

The following detailed description describes various features and functions of the disclosure with reference to the accompanying Figures. In the Figures, similar symbols typically identify similar components, unless context dictates otherwise. The illustrative systems described herein are not meant to be limiting. It will be readily understood that certain aspects of the disclosure can be arranged and combined in a wide variety of different configurations, all of which are contemplated herein.

I. OVERVIEW

Example embodiments may relate to and/or be implemented in a system in which unmanned vehicles, and in particular, "unmanned aerial vehicles" (UAVs), are configured to carry a load to be delivered. As examples, UAVs may be used to deliver medical equipment and/or supplies to a medical situation, such as an accident scene, or to deliver a package to an individual or business. In an embodiment, a network of UAVs may be distributed amongst a number of launch sites, from which UAVs may be deployed to deliver items to remote locations. In some cases, landing a UAV at the desired location on the ground may be difficult or undesirable for other reasons. Thus, it may be desirable for a UAV to fly to a desired location above a delivery site, and deliver a payload (or contents of the payload) from the air.

In operation the payload to be delivered is secured to the UAV and the UAV is then flown to the desired delivery site. The payload may be secured beneath the UAV, or even positioned partially or wholly within the UAV as the UAV flies to the delivery site. Once the UAV arrives at the delivery site, the UAV is operated in a hover mode and the payload is lowered from the UAV towards the delivery site. Accordingly, example embodiments may provide a winch system or another mechanism for lowering a payload from a hovering UAV to a desired ground location in a controllable manner.

The UAV may include a winch and braking system that is controllable to vary the rate at which a payload is lowered towards the ground. The UAV may further include a control system that is configured to deploy the payload at a desired rate of descent. For example, once the UAV reaches the delivery site, it may hover at a distance of 50-80 meters above the delivery site. Initially, the payload may be lowered at a rate of 3 to 4 meters a second, and when the payload nears the ground, the rate of descent may be reduced to 1 meter per second.

A payload-release mechanism may be used that secures the winch line to the payload, where the payload-release mechanism is configured to release the payload from the line when a control system determines that the payload is touching or within a threshold distance from the ground. Alternately, the payload may simply be emptied of its contents and the empty payload winched back up to the UAV.

During the lowering of the payload and subsequent raising of the winch line (e.g. when raising an empty payload container or simply raising the winch line where the payload has been released at the delivery site), the UAV is operating with a suspended load, or slung load. Windy conditions and other factors such as movement of the UAV to maintain its position in hover mode may cause the slung load to oscillate causing the slung load to move back and forth in a pendulum-like motion, also referred to as pendular motion. The pendular motion of an oscillating payload may have an undesirable effect on the stability of the UAV, create difficulties in positioning the load in a desired location on the ground, or create an undesired movement of the payload near the ground.

In particular, suspended loads carried from aerial vehicles suffer dynamics that are different from the dynamics of the vehicle in stable flight regimes. Because of this, the suspended load is capable of building up lots of energy in oscillating modes that are capable of destabilizing the carrying vehicle or making undesired contact with the surroundings.

Previous efforts to control slung loads from aerial vehicles have involved providing movement of the air vehicle itself as an input to controlling the dynamics of the slung load, and to damp the oscillations of the slung load. However, in some cases movement or translation of the UAV to control the pendular motion of the load may be impractical, limited or constrained such as cases where buildings are nearby or the delivery site is located in tight quarters.

It would be desirable to provide additional or alternate inputs for controlling the slung load to damp the oscillations of the slung load. Example embodiments are directed to the use of the existing winch system of the UAV to provide an additional or alternate input for controlling the slung load. In particular, an additional input of winding and unwinding the winch itself during ascent and descent of the payload may be used as another means for damping the oscillations of the slung load. By integrating the existing winch system into a system looking at both the disturbance on the aerial vehicle caused by the slung load and at sensors of the aerial vehicle itself as well as the slung load, additional damping possibilities are present.

The present embodiments are directed to the control of a slung load from an aerial vehicle through "pumping" of the winch to which the load is attached, which may be used separately or in conjunction with movement or translation of the aerial vehicle. For example, consider a hovering vehicle winching a payload to the ground. Conventionally, the pendular motion of the payload could be controlled by moving or translating the vehicle horizontally in response to the motion of the payload, e.g. by attempting to maintain the payload beneath the vehicle. Oscillations of the payload (e.g., pendulum-like swinging) would be damped by having the vehicle translate (e.g., move back and forth) in such a way that the oscillations are minimized.

However, in the present embodiments, the pendular motion of the payload may be controlled by "pumping" of the winch which may be used separately or in conjunction with vehicle translation to control the oscillations of the payload. Operating the winch in this manner could increase and decrease the amount of line between the hovering vehicle and the payload, and would allow an additional control input that does not necessarily interfere with the other control objectives of the system (e.g., does not prevent the vehicle from holding position while also damping payload oscillations).

In one embodiment, an Inertial Measurement Unit ("IMU") may be placed on the payload (or on the end of the winch line in cases where the payload is released at the delivery site), and which uses an accelerometer and/or gyroscope to measure the acceleration and angular velocity of the payload and frequency of oscillation. IMU measurements may be used to identify the phase of the oscillatory pendulum movement of the payload (i.e., where the payload is in pendular motion). A control system on board the aerial vehicle may be used to control the winding and/or unwinding of the winch line, or the rate of winding and/or unwinding of the winch line to "pump" the payload much like a swing, with line let out as the payload moves toward the bottom of the swing and the line held fast (or even wound in) as the payload moves towards the tops of the swing. In particular, the pumping frequency of the line may be matched to the oscillation frequency of the payload. For example, the pumping period or phase may be matched to the oscillatory periods and phase of the line. By doing this, some of the energy of the swinging payload may be removed even as the vehicle remains stationary.

As an example, when there is large distance between the payload and the aerial vehicle, the pendular motion of the payload may be very slow, on the order of ¼ hertz. At this point the amount of the winch line unwound or wound onto the winch during "pumping" of the winch may be on the order of meters. As the payload gets closer to the aerial vehicle, the pendular motion may speed up to on the order of 1 hertz or more. In this case, the amount of the winch line unwound or wound onto the winch during "pumping" may be on the order of centimeters.

As an example, during descent of the payload, the oscillations of the payload may be damped by letting winch line out at as the payload approaches the bottom of the swing, while when the payload is moving towards the tops of the swing, the amount of winch line unwound from the winch could be reduced or stopped, or the winch line could even be wound in as the payload moves to the tops of the swing. Such pumping of the winch line may counteract the pendular motion of the payload to control and damp the oscillations of the payload.

As another example, during ascent of the payload, the oscillations of the payload may be damped by winding the winch line in as the payload moves to the tops of the swing, and while when the payload is moving towards the bottom of the swing the winch line could be unwound, or stopped, or wound in at a reduced rate.

One advantage of controlling the slung load in this manner is that it does not require the addition of any new actuators (i.e., it uses the winch and braking system that is already required by the system), but provides an additional input for controlling the slung load compared to control systems that rely solely on translation or horizontal movement of the aerial vehicle to control the load.

By being able to "pump" the load like a swing, energy may be removed and the oscillation of the slung load damped without requiring any translation of the vehicle. This makes control of the aerial vehicle easier, less energy intensive and less destabilizing to normal flight dynamics. In some embodiments, control of the slung load may use a combination of aerial vehicle translation and winching/unwinching of the winch line. However, where winch control alone is used to control the load, less horizontal movement of the vehicle may be achieved which may be an important feature if delivery is to take place in tight quarters, such as in a backyard of a home.

II. ILLUSTRATIVE UNMANNED VEHICLES

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 110 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself to adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
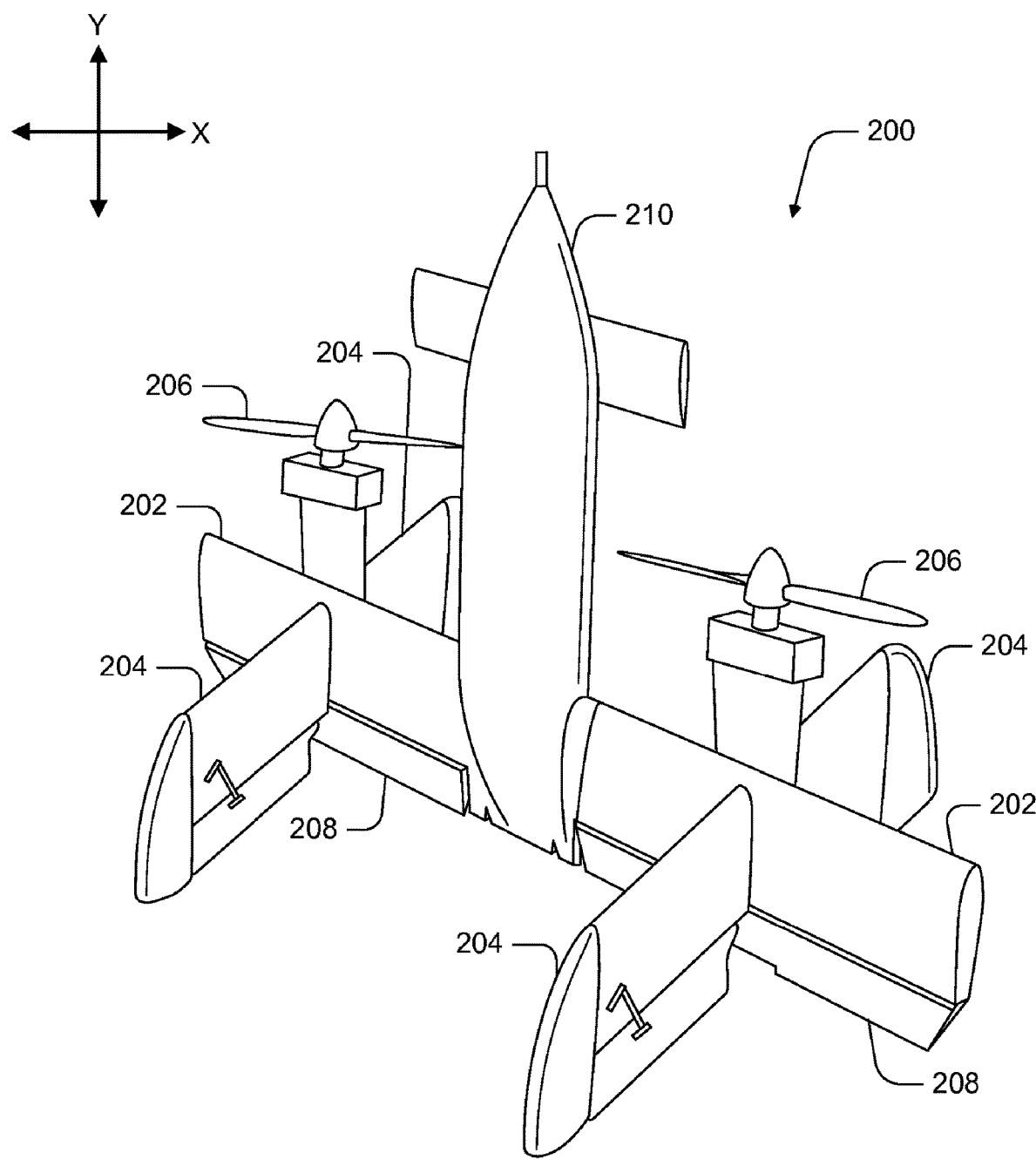

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 to take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitter UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
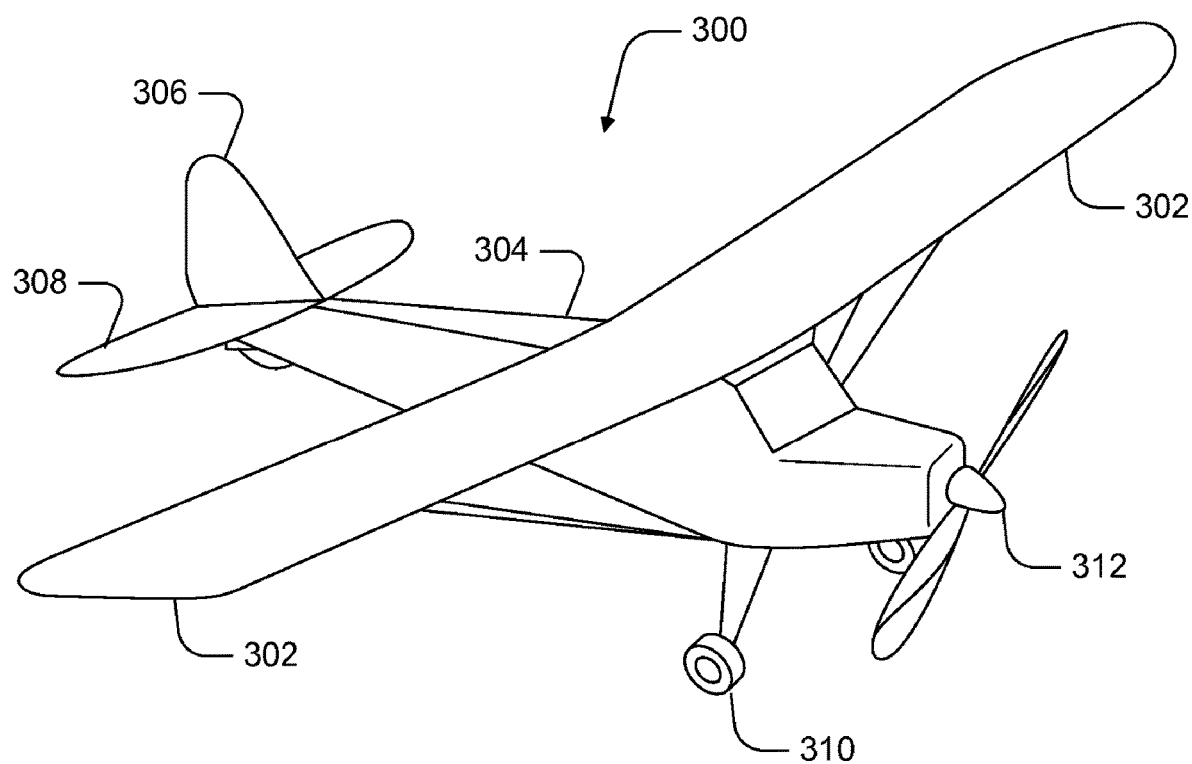

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
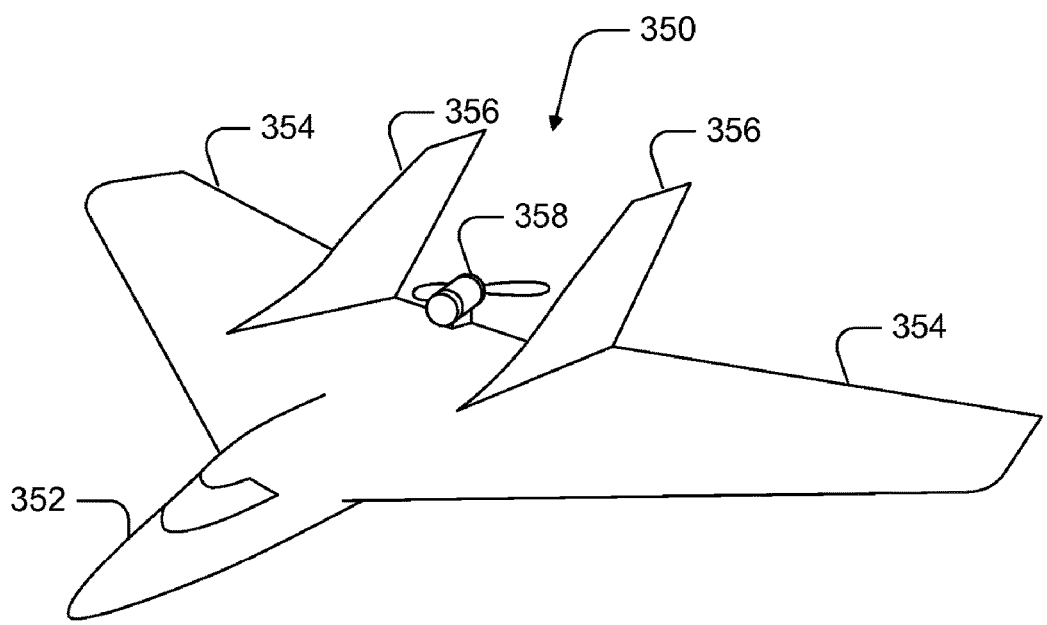

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. ILLUSTRATIVE UAV SYSTEMS

Figure 4:
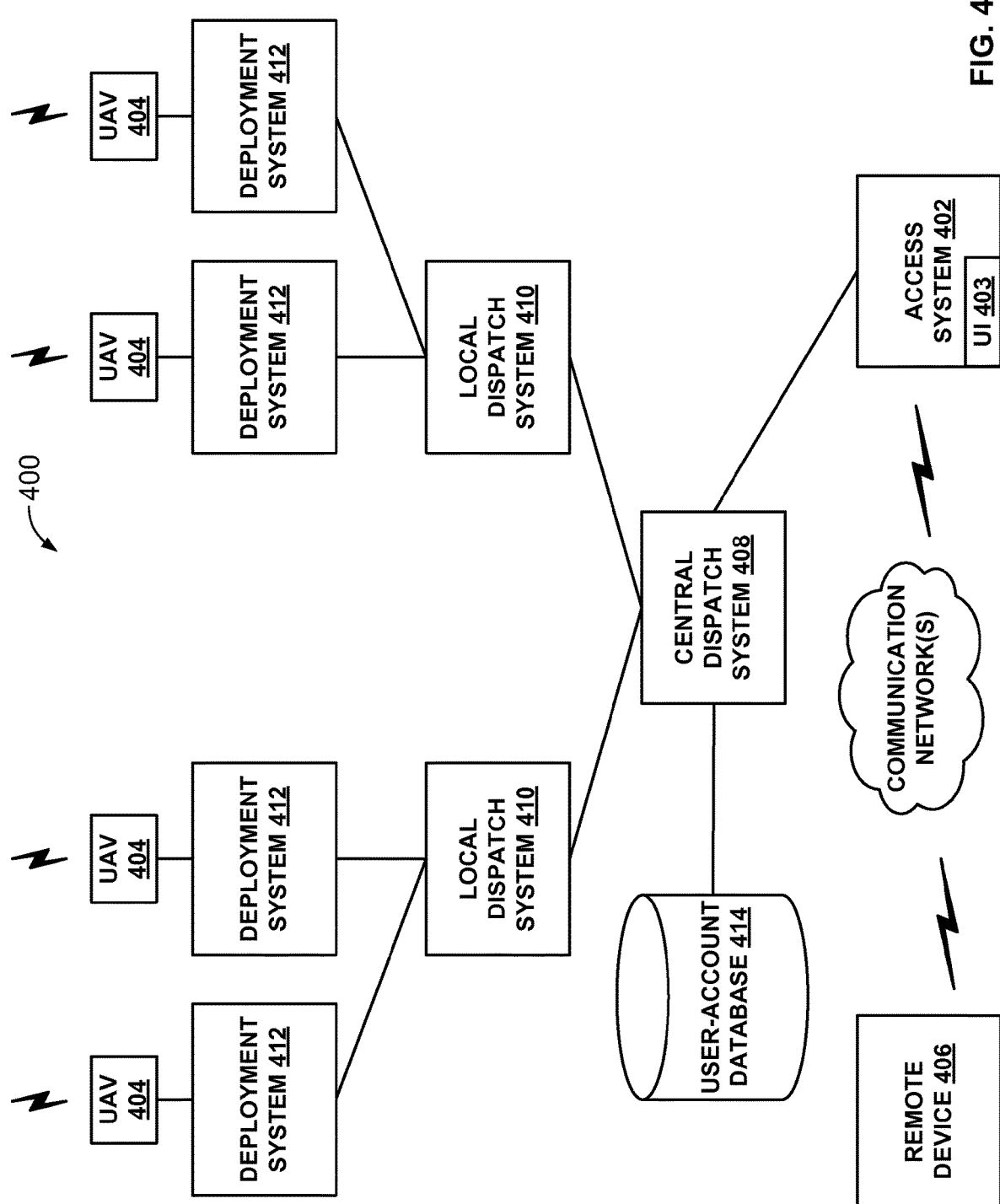
FIG. 4 is a simplified block diagram illustrating a network of unmanned aerial vehicles, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 4 is a simplified block diagram illustrating a distributed UAV system 400, according to an example embodiment.

In an illustrative UAV system 400, an access system 402 may allow for interaction with, control of, and/or utilization of a network of UAVs 404. In some embodiments, an access system 402 may be a computing system that allows for human-controlled dispatch of UAVs 404. As such, the control system may include or otherwise provide a user interface (UI) via which a user can access and/or control UAVs 404. In some embodiments, dispatch of UAVs 404 may additionally or alternatively be accomplished via one or more automated processes.

Further, an access system 402 may provide for remote operation of a UAV. For instance, an access system 402 may allow an operator to control the flight of a UAV via user interface (UI). As a specific example, an operator may use an access system to dispatch a UAV 404 to deliver a package to a target location, or to travel to the location of a medical situation with medical-support items. The UAV 404 may then autonomously navigate to the general area of the target location. At this point, the operator may use the access system 402 to take over control of the UAV 404, and navigate the UAV to the target location (e.g., to a particular person to whom a package is being sent). Other examples of remote operation of a UAV are also possible.

In an illustrative embodiment, UAVs 404 may take various forms. For example, each UAV 404 may be a UAV such as those illustrated in FIGS. 1, 2, 3A, and 3B. However, UAV system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of medical support.

A remote device 406 may take various forms. Generally, a remote device 406 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Other types of remote devices are also possible.

Further, a remote device 406 may be configured to communicate with access system 402 via one or more types of communication network(s) 414. For example, a remote device 406 could communicate with access system 402 (or via a human operator of the access system) by placing a phone call over a POTS network, a cellular network, and/or a data network such as the Internet. Other types of networks may also be utilized.

In some embodiments, a remote device 406 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 400 may receive location information (e.g., GPS coordinates, etc.) from the user's mobile phone, or any other device on the user's person, such that a UAV can navigate to the user's location (as indicated by their mobile phone).

In some embodiments, a remote device 406 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 402 to dispatch a UAV 404.

As noted, a remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs to various target locations. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations each of the UAVs 404 is configured for (in the event that a UAV fleet includes multiple types of UAVs configured for different services and/or operations). Additionally or alternatively, each local dispatch system 410 may be configured to track which of its associated UAVs 404 are currently available for deployment and/or which services or operations each of its associated UAVs is configured for.

In some cases, when central dispatch system 408 receives a request for UAV-related service from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410.

In an example configuration, a local dispatch system 410 may be implemented in a computing system at the same location as the deployment system or systems 412 that it controls. For example, in some embodiments, a local dispatch system 410 could be implemented by a computing system at a building, such as a fire station, where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of UAV system 400 are possible. For example, in some embodiments, a user of a remote device 406 could request medical support directly from a central dispatch system 408. To do so, an application may be implemented on a remote device 406 that allows the user to provide information regarding a requested service, and generate and send a data message to request that the UAV system provide the service. In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Such a launch system may include features that allow for a human-assisted UAV launch and/or features that provide for an automated UAV launch. Further, a deployment system 412 may be configured to launch one particular UAV 404, or to launch multiple UAVs 404.

A deployment system 412 may further be configured to provide additional functions, including for example, diagnostic-related functions such as verifying system functionality of the UAV, verifying functionality of devices that are housed within a UAV (e.g., such as a defibrillator, a mobile phone, or a Head Mounted Device ("HMD")), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 400 may include or have access to a user-account database 414. The user-account database 414 may include data for a number of user-accounts, and which are each associated with one or more person. For a given user-account, the user-account database 414 may include data related to or useful in providing UAV-related services. Typically, the user data associated with each user-account is optionally provided by an associated user and/or is collected with the associated user's permission.

Further, in some embodiments, a person may have to register for a user-account with the UAV system 400 in order to use or be provided with UAV-related services by the UAVs 404 of UAV system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of UAV system 400. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. ILLUSTRATIVE COMPONENTS OF A UAV

Figure 5:
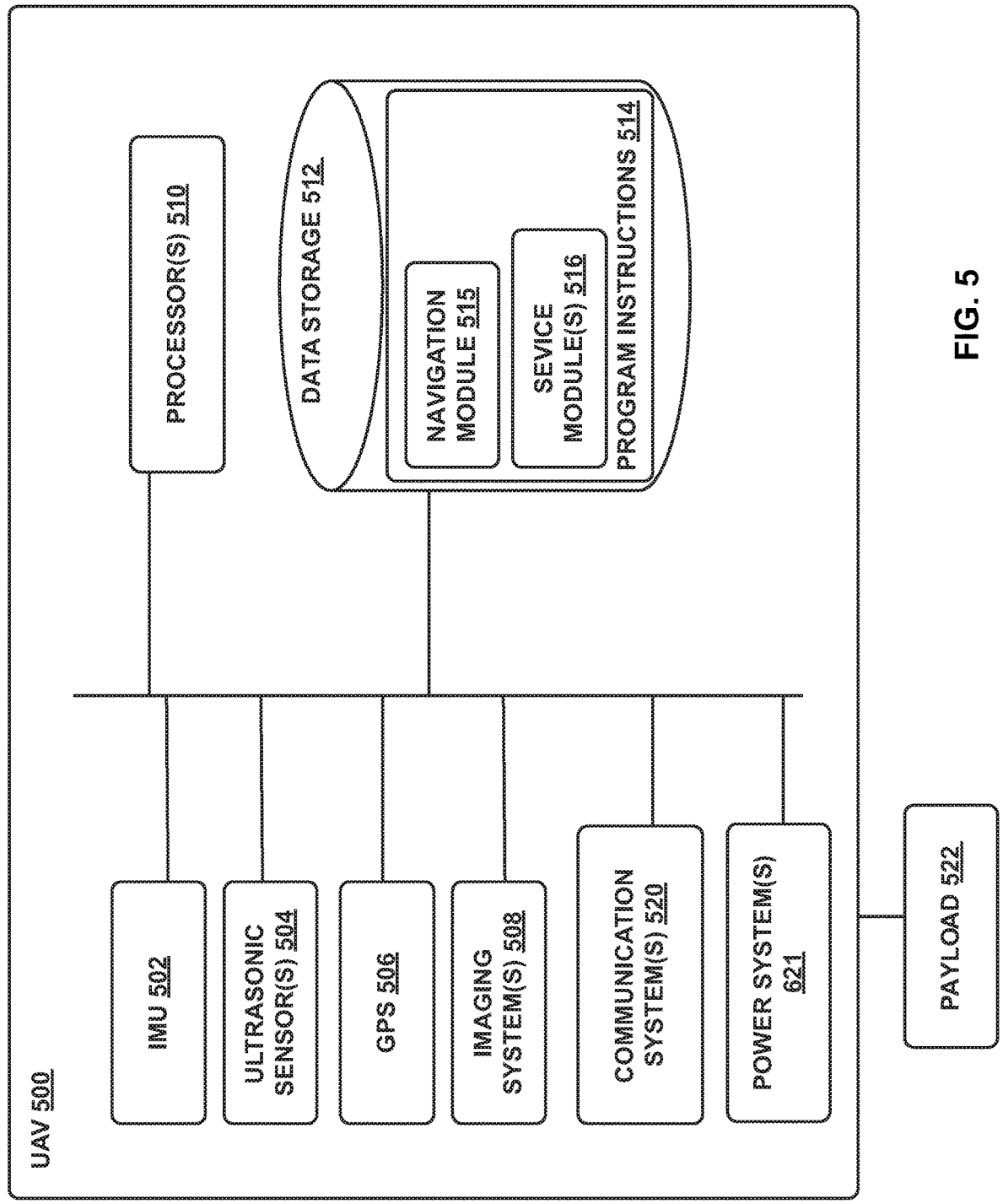
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms. Further, UAV 500 may include components and features that are not explicitly shown, such as components and features of the UAVs 600 and 700 shown in FIGS. 6A-B and 7A-C.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more medical-support modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 500 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person once a UAV 500 has navigated to the general area of the person. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of a target delivery location (or of a moving subject such as a person or their mobile device), the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

As an additional example, once a UAV 500 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, the payload 522 of a given UAV 500 may include or take the form of a "package" designed to transport medical-support items to a target delivery location. For example, a medical-support UAV may include a package with one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc. In other cases, a UAV 500 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

F. Service Modules

As noted above, UAV 500 may include one or more service modules 516. The one or more service modules 516 include software, firmware, and/or hardware that may help to provide or assist in the provision of the medical-support functionality described herein.

Configured as such, a UAV 500 may provide medical support in various ways. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a service module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

It should be understood that the examples of medical-support functionality that are provided herein are not intended to be limited. A UAV may be configured to provide other types of medical-support functionality without departing from the scope of the invention.

V. SYSTEMS FOR LOWERING PAYLOAD FROM HOVERING UAV TO GROUND

Figure 6B:
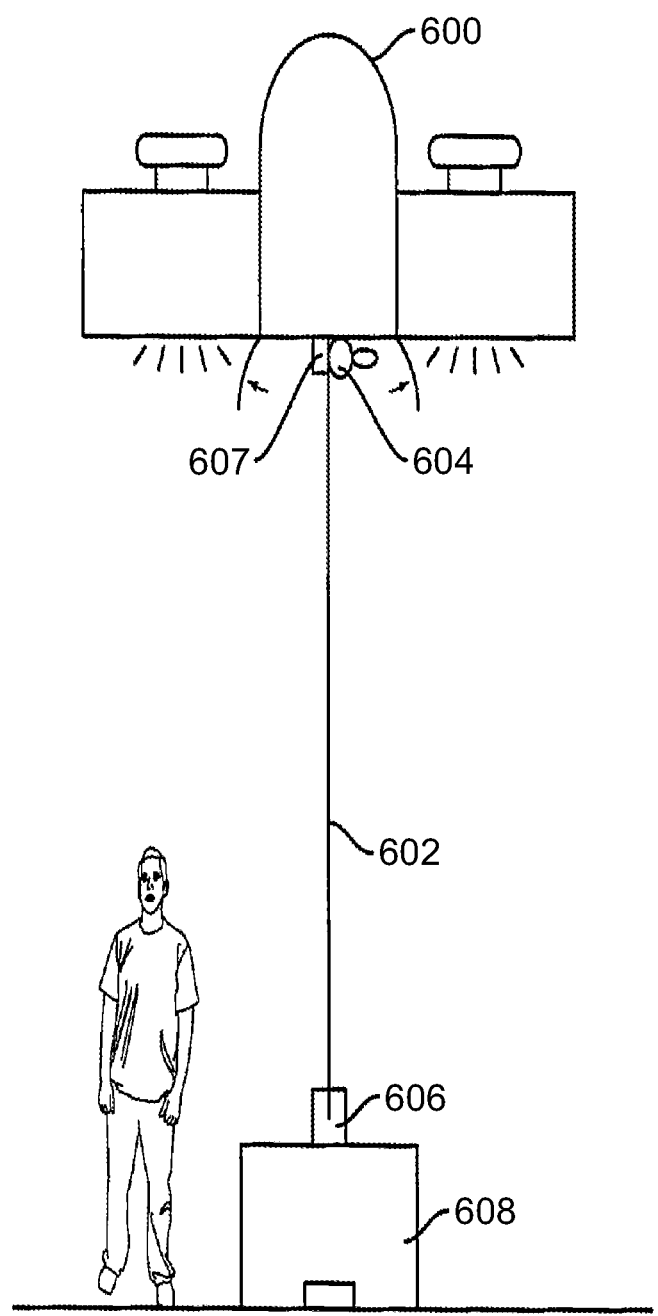

FIGS. 6A and 6B show a UAV 600 that includes a payload delivery system, according to an example embodiment. As shown, payload delivery system for UAV 600 includes a line 602, a line-deployment mechanism 604, a payload-release mechanism 606, and a payload 608. The payload 608 may itself be the item to be delivered. Thus, the payload 608 may contain items that are desired to be delivered to the delivery site. In either case, the payload delivery system of UAV 600 may be operable to autonomously lower payload 608 to the ground in a controlled manner.

More specifically, as shown in FIG. 6A, the UAV may be operable to hold the payload 608 against or close to the bottom of the UAV, or possibly even inside of the UAV 600, during flight from a launch site to the delivery location. Then, when the UAV 600 reaches the delivery location, the UAV's control system may operate the line-deployment mechanism 604 such that the payload 608 is lowered to the ground, as shown in FIG. 1B.

The UAV may accordingly include features that can hold the payload in place and/or stabilize the payload during flight. Such features may be moveable such that the line-deployment mechanism 608 can lower the payload upon arriving at the delivery location. For instance, in the configuration shown in FIG. 6A, UAV 600 includes moveable brackets 614. Brackets 614 may hold payload 608 in place during flight, as shown in FIG. 6A. When UAV 600 reaches the delivery location, brackets 614 may be removed from payload 608, so that the payload can be lowered towards the ground. Note that other types of mechanisms may also be used to hold the payload in place and/or to stabilize the payload during flight. Alternatively, the payload may simply be held in place during flight by the line, without use of any additional features.

In a further aspect, when the control system detects that the payload has been lowered to a point where it is at or near the ground, the control system may responsively operate the payload-release mechanism 606 to detach the payload from the line. As such, the UAV's control system may use various types of data, and various techniques, to determine when the payload is at or near the ground. Further, the data that is used to determine when the payload is at or near the ground may be provided by sensors on UAV 600, sensors on the line 602, sensors on the payload 608, and/or other data sources.

A. Line-Deployment Mechanism

In an example embodiment, the line-deployment mechanism may include or take the form of a winch that is configured to deploy a line with a payload attached thereto. The winch may include a motor (e.g., a DC motor) that can be actively controlled by a servomechanism (also referred to as a "servo") and a microcontroller. The microcontroller may output a desired operating rate (e.g., a desired RPM) for the winch, which may correspond to the speed at which the line and payload should be lowered towards the ground. The servo may then control the winch so that it maintains the desired operating rate.

In a further aspect, the line-deployment mechanism 604 may vary the rate at which the line and payload are lowered to the ground. For example, a microcontroller may change the desired operating rate according to a variable deployment-rate profile and/or in response to other factors in order to change the rate at which the payload descends towards the ground. To do so, the line-deployment mechanism 604 may adjust the amount of braking or the amount of friction that is applied to the line. For example, to vary the line deployment rate, the line-deployment mechanism 604 may include friction pads that can apply a variable amount of pressure to the line. As another example, a line-deployment mechanism 604 can include a motorized braking system that varies the rate at which a wheel lets out the line. Such a braking system may take the form of an electromechanical system in which motor operates to slow the rate at which a spool lets out the line. Further, the motor may vary amount by which it adjusts the speed (e.g., the RPM) of the spool, and thus may vary the deployment rate of the line. Other examples are also possible.

In some embodiments, the line-deployment mechanism may be attached to the payload, instead of being attached to the UAV housing. For example, a winch could be attached to the top of the payload. In such an embodiment, the winch may be operable to hold the payload at or near the bottom of the UAV housing during flight to a delivery location. Further, upon arriving at the delivery location, the winch may be operable to lower the payload by releasing the line and/or using a brake to adjust the rate at which the line is released. Further, it is contemplated that other types of line-deployment mechanisms may also be attached to the payload.

B. Payload-Release Mechanism

In some embodiments, the payload 608 and/or payload-release mechanism 606 may be designed with features that help to prevent the payload 608 and/or the payload-release mechanism 606 from getting stuck or caught during descent (e.g., to prevent getting caught and/or tangled in a tree or on a power line). For instance, the payload 608 and/or payload-release mechanism 606 may take the form of or be housed in a teardrop-shaped component, or another shape that can be more easily moved up and down without getting stuck.

Various other types of payload-release mechanisms are possible, depending on the particular implementation. For example, a UAV could include a payload-release mechanism that is positioned on the line or at the top of the line, which is operable to cut the line or release the line from UAV when the payload is at or near the ground. Other examples are also possible.

Further, in some embodiments, there may be no payload-release mechanism. For example, the payload could be attached to a rolling mechanism that, once released, simply rolls off the end of the line, as shown in FIGS. 7A to 7C.

Figures 7A, 7B:
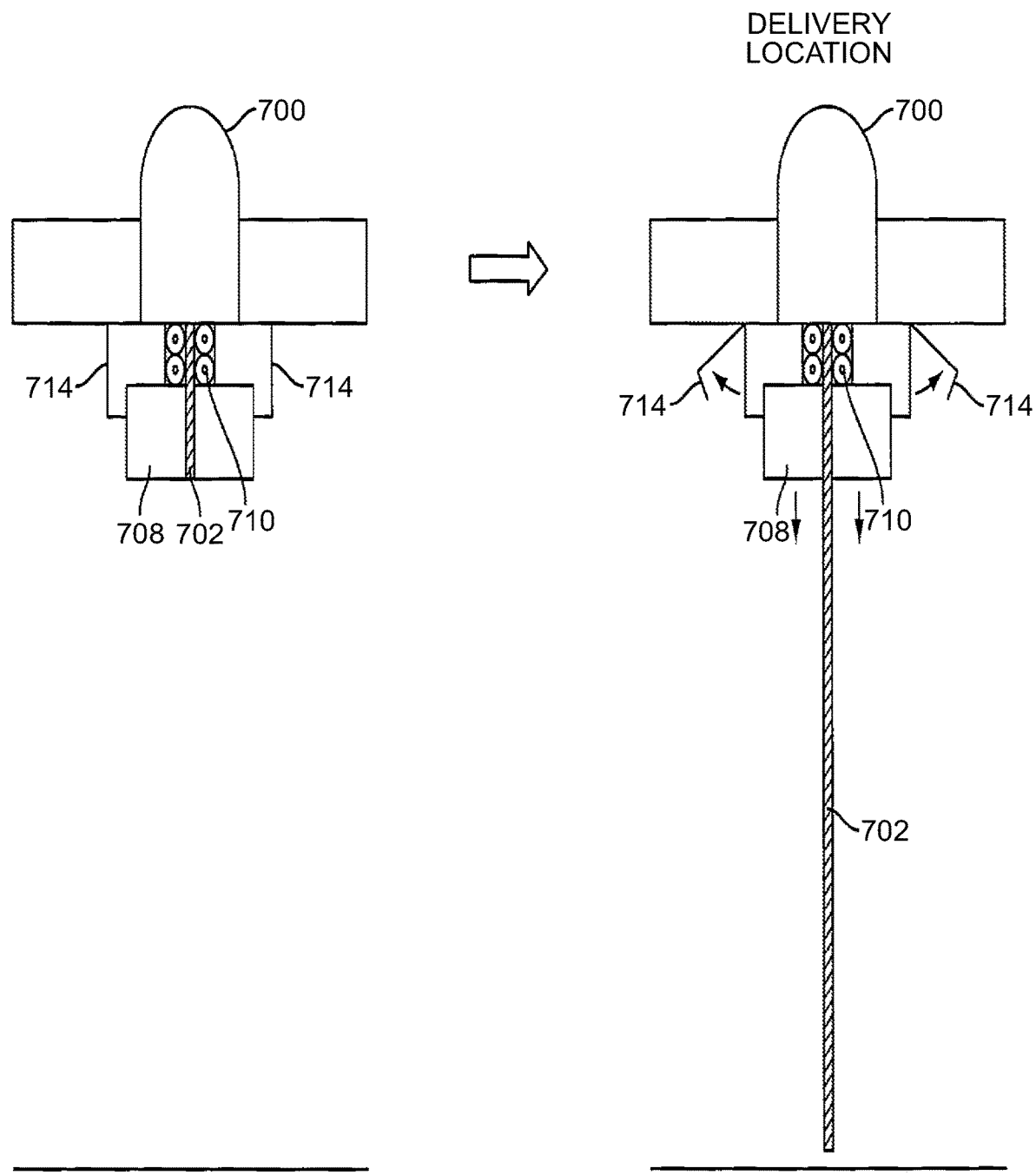
FIGS. 7A, 7B, and 7C show another UAV that includes a payload delivery system, according to an example embodiment.
Figure 7C:
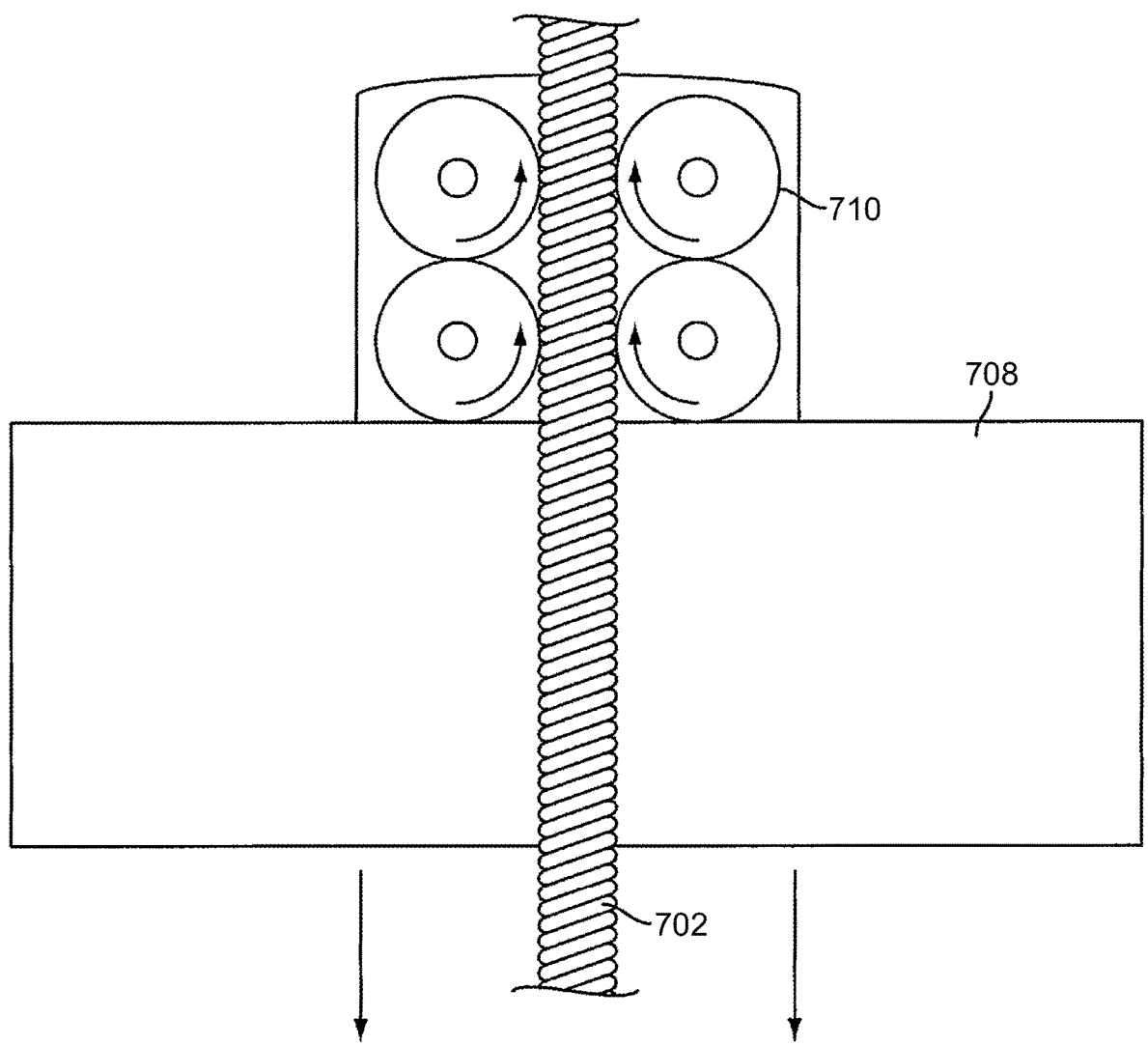

More specifically, FIG. 7A shows a UAV 700 with a payload 708 that includes a wheel mechanism 710. During flight to a delivery location, the payload 708 may be held in place a line-deployment mechanism, which in this case may be retractable features 714. When the UAV arrives at the delivery location, the line 702 may be deployed, and the retractable features 714 may then be retracted such that the payload descends along the line 702. (Note that there may be a mechanism, which is not shown in FIGS. 7A to 7C, for retracting or otherwise holding the line itself near the UAV during flight, and then releasing and/or lowering the line upon reaching the delivery location.) The wheels of the wheel mechanism 710 may be configured to pinch the line and thus limit the descent rate of the payload. The pressure exerted by the wheels on the line may be variable and controllable so as to vary the descent rate.

C. Control System

In an example embodiment, a UAV 600 may include a control system to provide various functions described herein. The control system may include or take the form of program instructions stored in a non-transitory computer-readable medium.

The control system may be configured to determine a variable deployment-rate profile, which indicates the timing with which to increase and/or decrease the deployment rate of the line 602, and thus the descent rate of the payload 608, as the payload is being lowered to the ground. For instance, in some cases, a variable deployment-rate profile may be such that the payload starts descending at a higher speed, and gradually decreases in speed as the payload approaches the ground. In other cases, a variable deployment-rate profile may indicate more discrete adjustments to friction (e.g., braking adjustments) and thus to descent rate. For example, a variable deployment-rate profile may cause the payload to descent at a constant, higher speed, until the payload is within a certain distance from the ground (e.g., 5 or 10 feet), at which point, the friction may increase significantly in order to reduce the descent rate. Other examples are also possible.

In a further aspect, a control system of UAV 600 may intelligently control the payload-release mechanism 606 to release the payload 608 at or near the ground. For example, a control system may trigger the payload-release mechanism 606 after certain criteria are met, for example after a certain length of line has been let out, such that it is expected that the payload 608 is on the ground, or near enough to the ground that it can safely drop to the ground. Other examples are also possible.

To facilitate implementation of a controlled descent (or ascent), a UAV 600 may include a system for determining the amount (e.g., the length) of the line that has been let out by the line-deployment mechanism 604. For example, the line length may be determined based on a counter, which counts the rotations of a motor that turns a winch in the line-deployment mechanism 604. Since the amount of line that has been let out may be generally proportional to the number of rotations of the winch (recognizing that rate of line let out is proportional to the radius of the spool, which changes and becomes smaller as more line is let out), the length of the line that has been let by the winch may be calculated based on the number of rotations of motor that powers the winch.

The length of line 602 that has been let out may then be used to determine the distance between the payload 608 and the ground. More specifically, given the height of the payload itself, the height of the payload-release mechanism (if any), the length of the line 602, and the altitude difference between the top of the line 602 and the point where altitude is measured by the UAV 600 (if any), the UAV 600 may determine the distance between the bottom of the payload 108 and the ground. Thus, the distance between the payload 608 and the ground can be updated as the line 602 is deployed to, e.g., determine when to change the deployment rate of line 602, as desired.

D. Emergency-Release System

In yet a further aspect, a UAV 600 may include an emergency system (not shown in the Figures), which is configured to cut or release the line. In particular, the UAV 600 may be configured to detect certain emergency situations, such the line 602 and/or payload getting stuck (e.g., in a tree), and to automatically cut the line when such an emergency situation is detected.

Various types of emergency-release mechanisms are possible, which may be configured to cut the line holding the payload or otherwise release the line from the UAV. Alternatively, an emergency-release mechanism could cut or mechanically release the payload from the line.

Further, various types of data may be analyzed to determine if and when an emergency-release mechanism should be used to release the payload. For example, a UAV control system could analyzed image data from a camera, data from a line-tension sensor, and/or other types of data to determine that the payload is stuck or that deployment of the payload has otherwise failed, and responsively use the emergency-release mechanism to release the payload.

E. Illustrative Payloads

In some embodiments, the payload may take the form of a container that includes medical-support devices and/or other items intended to help in a medical situation. In other embodiments, the payload may itself be a medical-support device (e.g., a defibrillator) or another type of medical support item, (e.g., a first-aid kit or medicine). Illustrative embodiments may also include or be implemented in conjunction with other types of medical and/or non-medical payloads.

When the payload 608 includes powered components (e.g., sensors, communications systems, and/or medical-support devices), the payload may include a power source. In some embodiments, the payload 608 could include a capacitive power source that charges from a power source on the housing of the UAV 600. The capacitive power source on the payload may be configured such when held in a retained position, as in FIG. 6A, the capacitive power source touches contacts on the UAV housing and thus is charged by a power source in the housing of the UAV 600. The capacitive power source may store enough energy to power the payload 608 for, e.g., two to three minutes after it is separated from the housing and begins the descent towards the ground.

F. Communication Systems Between the Payload and the UAV

In some embodiments, the UAV 600 may be configured to communicate with payload 108 in order to send data to and/or receive data from sensors and/or systems on the payload 108. In particular, a control system or systems in the main housing of the UAV 100 may communicate with (or possibly just receive data from) sensors and/or systems that are mounted to or integrated in the payload 608. For example, data from sensors on the payload may provide feedback as to the state of the payload while it is being deployed and/or be utilized to determine when the payload has reached the ground and/or is near to the ground or another object. Other examples are also possible.

In such an embodiment, the payload 608 and the housing of UAV 600 may both have wireless communication interfaces for wireless communications between the payload and the UAV housing. Alternatively, wiring could be included in an example system for wired communications between the UAV housing and the payload. Further, in some embodiments, wiring for communications between the payload and the UAV may be enclosed in the line 602 that is used to lower the payload 608 to the ground.

In an example embodiment, the UAV 600 may dynamically determine the rate of deployment that should be for the particular situation in which the UAV is lowering its payload towards the ground. For example, the UAV may determine the variable deployment-rate profile based on factors such as: (a) the UAV's altitude, (b) wind conditions, (c) environmental factors (e.g., trees, power lines, etc.), and/or (d) payload characteristics (size, shape, weight, fragility of contents, etc.), among other possibilities.

As noted above, in some embodiments, a UAV may vary the deployment rate based on weather conditions at the delivery location. For instance, a UAV may adjust the deployment rate based on the wind at the delivery location. As an example, if the wind is stronger, the UAV may increase the deployment rate at some or all stages of deployment, in an effort to reduce the effect of the wind on the payload as it is being lowered.

Further, weather conditions such as the wind may be considered in combination with other factors. For instance, the UAV may consider the weight and/or structure of the payload in combination with the wind and/or other factors. To illustrate, if the UAV is lowering a payload that is heavier and/or has a structure that is less susceptible to being moved by the wind, the UAV may make lesser increases in deployment rate at a given wind speed, than it would for a payload that is lighter and/or has a structure that is more susceptible to being moved by the wind. Other examples are also possible The UAV may also take into account weather conditions at the delivery location when determining the desired hovering height for a variable deployment-rate profile. For instance, the UAV may attempt to hover at a lower height when there are higher winds, in an effect to reduce the effect of the wind on the line and payload as the payload is being lowered. The UAV may also take its surrounding environment into account, e.g., and adjust its hovering height in an effort to prevent the payload from colliding with objects (e.g., trees, people, cars, buildings, power lines, etc.) as the payload is being lowered from the UAV.

In a further aspect, a UAV 600 may proactively determine movements that offsets, prevents, or otherwise reduce pendulum-like movement of the payload as the payload is being lowered to the ground. For example, when payload 608 is lowered via a line 602, the payload may act as a pendulum hanging from the UAV, and thus may have a tendency to swing back and forth thru an arc due to wind and/or horizontal movement of the UAV, for instance. Therefore, the UAV 600 may take into account data such as the current wind conditions and/or the weight distribution of the contents of the payload 108 in order to proactively determine horizontal movements that offset the expected horizontal forces on the payload. As such, the UAV 600 may indicate horizontal movements and timing for such movements, which is expected to offset the expected horizontal forces on the payload and prevent or damp the oscillation of the payload 608 on the line 602. Additionally or alternatively, the UAV 600 may observe oscillation of the payload 608 while it is being lowered, and dynamically respond by moving horizontally to damp the oscillation.

In a further aspect, a UAV 600 may reactively move in a manner that offsets, prevents, or reduces movement of the payload as the payload is being lowered to the ground. For instance, as noted above, the payload may act as a pendulum while it is being lowered from the UAV, and thus may have a tendency to swing back and forth thru an arc. As such, the UAV 600 may take into account data such as wind data and/or detected movement of the UAV while the payload is being lowered, in order to reactively determine horizontal movements that offset the expected horizontal forces on the payload, and prevent or damp the oscillation of the payload 608 on the line 602.

VI. CONTROLLING THE PAYLOAD DURING DESCENT AND ASCENT

FIG. 8 is an example showing an example UAV 600 with a line-deployment mechanism, or winch 604 and a line speed sensing mechanism 607. Line-deployment mechanism 604 may take the form of a winch having a line 602 attached to a payload 608. A payload release mechanism 606 is positioned at the end of line 602 for applications, where it is desired to release the payload 608 at a delivery site. In other embodiments, the payload 608 may remain attached to line 602 after the contents of the payload 608 have been delivered, and the empty payload 608 wound back in with the winch 604.

Payload 608 may include an inertial measurement unit (IMU) that can provide measurements to the control system of the UAV 600. As noted above, during the descent and/or ascent of the payload 608, windy conditions and other factors such as movement of the UAV 600 to maintain its position in hover mode may cause the payload 608 (sometimes referred to as a slung load) to oscillate causing the slung load to move back and forth in a pendulum-like motion, also referred to as pendular motion. The pendular motion of an oscillating payload 608 may have an undesirable effect on the stability of the UAV 600, create difficulties in positioning the payload 608 in a desired location on the ground, or create an undesired movement of the payload 608 near the ground.

The IMU 608 may provide the UAV 600 with information regarding the pendular motion of the payload 608, by using an accelerometer and/or gyroscope to measure the acceleration and angular velocity of the payload 608 and frequency of oscillation. IMU measurements may be used to identify the phase of the oscillatory pendulum movement of the payload 608, (i.e., where the payload 608 is in pendular motion). Thus, the IMU may determine the rate or period of oscillation of the payload 608, and length of payload travel during the pendular motion, as well as angle of the winch line 602.

As noted above, in some embodiments, the payload 608 may remain attached to the winch line 602 in which case the IMU 610 may be positioned on the payload 608. The term "on the payload" shall be construed broadly to mean the IMU is positioned on the payload exterior or interior, or within the payload, or connected to the payload. However, in other embodiments, the payload 608 may be released from the winch line 602 and remain at the delivery site. In those applications where the payload 608 is released and left at the delivery site, the IMU 610 may be positioned at an end of the winch line 602 to allow the IMU to provide information regarding the pendular motion of the end of the winch line 602 during ascent as the winch line 602 is wound in.

Suspended loads carried from aerial vehicles suffer dynamics that are decoupled from the vehicle in stable flight regimes. Because of this, the suspended load is capable of building up lots of energy in oscillating modes that are capable of destabilizing the carrying vehicle or making undesired contact with the surroundings.

Therefore, previous efforts have been made to control slung loads from aerial vehicles that involve providing horizontal movement or translation of the air vehicle itself as an input to controlling the dynamics of the slung load, and to damp the oscillations of the slung load. Thus, as shown in FIG. 8, the UAV may be caused to move in the direction of arrow 622 or 620 to reduce or damp the oscillations of the payload 608.

However, in some cases movement or translation of the UAV 600 to control the pendular motion of the payload 608 may be impractical such as cases where buildings are nearby or the delivery site is located in tight quarters. Further, translation of the UAV 600 may not be desired in the case of delivering a payload to specific delivery site. As a result, it would be useful to provide additional or alternate inputs for controlling the payload 608 to damp the oscillations of the payload 608.

Example embodiments are directed to the use of the existing winch system 604 of UAV 600 to provide an additional or alternate input for controlling the movement of payload 608. In particular, an additional input of winding and unwinding the winch itself during ascent and descent of the payload 608 may be used as another means for damping the oscillations of the payload 608. By integrating the existing winch system 604 into a system looking at both the effect on the UAV 600 caused by the movement of the payload 608 using sensors on the UAV 600 itself as well as the IMU 610 positioned on the payload 608, additional damping possibilities are present.

As illustrated in FIGS. 9A-9D, the pendular motion of payload 608 during descent may be controlled through "pumping" of the winch line 602 to which the payload 608 is attached. A control system on board the UAV 600 discussed above, may be used to control the winding and/or unwinding of the winch line 602, or the rate of winding and/or unwinding of the winch line 602 to "pump" the payload 608 much like a swing, with line let out as the payload moves to the bottom of the swing and held fast (or even wound in) as the payload moves to the tops of the swing.

This pumping of the winch line 602 may be used separately or in conjunction with movement or translation of UAV 600 in the direction of arrows 620 and 622 shown in FIG. 8. As the UAV 600 hovers over a delivery site lowering the payload 608 to the delivery site, the pendular motion of the payload 608 may be controlled by varying the rate at winch line 602 is unwound, or even reversing the direction of winch line and winding in the winch line 602. Operating the winch 604 in this manner may be used to increase and/or decrease the amount of winch line 602 between the UAV 600 and the payload 608, and allows for an additional control input for controlling the movement of the payload 608 that does not necessarily interfere with the other control objectives of the system (e.g., does not prevent the vehicle from holding position while also damping payload oscillations). By operating the winch 604 in this manner, the energy of the swinging payload 608 may be removed even as the UAV 600 remains stationary.

Figures 9A, 9B, 9C, 9D:
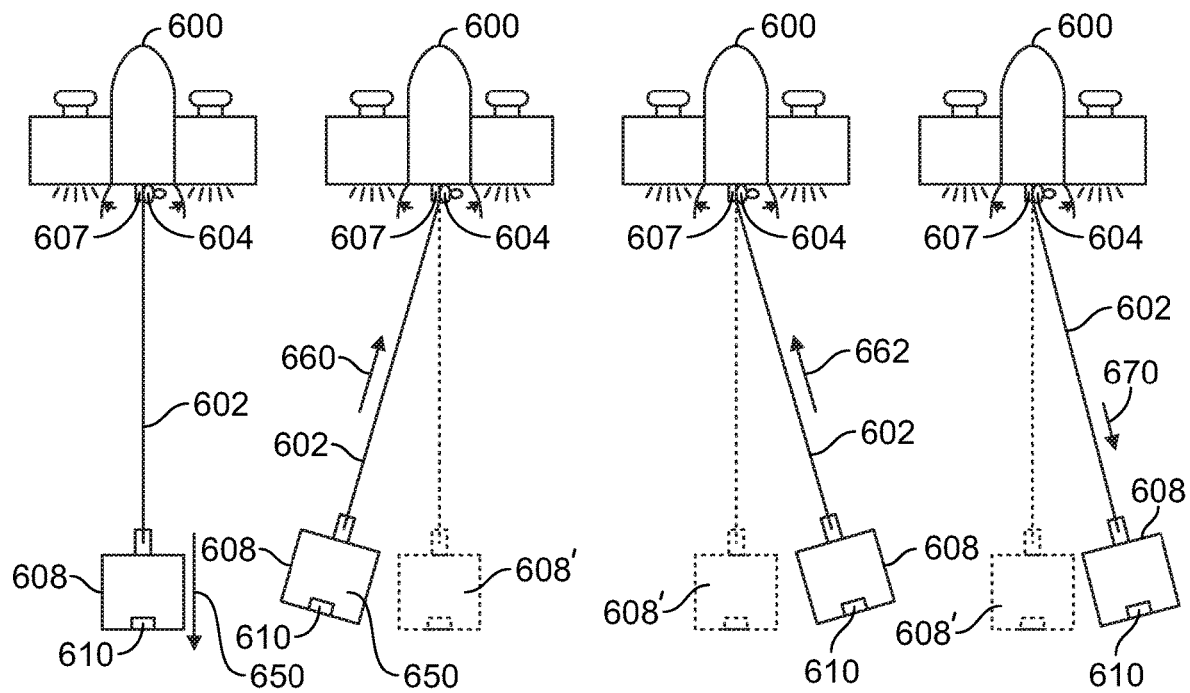
FIGS. 9A, 9B, 9C, and 9D are simplified illustrations of a UAV during descent of the payload, according to an example embodiment.

FIGS. 9A-9D illustrate the pumping of the payload 608 during descent to reduce or damp the oscillations of payload 608. As illustrated in FIG. 9A, as the payload moves towards the bottom of the swing, the winch line 602 is unwound from winch 604 so that payload 608 descends in a direction indicated by arrow 650. As shown in FIG. 9B, after moving from the bottom of the swing 608', as the payload moves to the top of the swing to the left, the winch line 602 may be wound in a direction represented by the arrow 660. As the payload 608 returns the bottom of the swing (as shown in FIG. 9A and shown as 608'), the winch line 602 may again be unwound from winch 604 so that payload 608 descends in a direction indicated by arrow 650. As shown in FIG. 9C, as the payload moves to the top of the swing to the right, the winch line 602 may be wound in a direction represented by the arrow 662. The payload 608 will then return to the bottom of the swing as shown in FIG. 9A, during which time line may again be unwound from the winch.

As illustrated in FIGS. 9A-9C, during one period of oscillation, the direction that the winch line is wound in or unwound may be reversed on two separate occasions. The process may be repeated for successive periods of oscillation. The rate of speed at which the winch line 602 is wound in or unwound may vary from one period of oscillation to the next as the distance of the payload 608 to the UAV 600 changes, and may even be varied within a single period of oscillation. In addition, the rate at which the line is wound or unwound during a period of oscillation may be proportional to the rate of the speed of the payload, or proportion to the rate of the speed of the payload squared.

As illustrated in FIG. 9D, rather than winding in the winch line 602 as the payload moves towards the tops of the swing, the rate at which the winch line 602 is unwound may be reduced or stopped as the payload moves towards the tops of the swing, as represented by the magnitude and direction of arrow 670. In this situation, during one period of oscillation, the rate at which the winch line 602 is unwound may be changed on at least two separate occasions. In particular, the rate at which line is unwound as the payload moves to the bottom of the swing may be reduced or stopped and the rate at which the line is unwound may be increased as the payload moves to the top of the left swing. The rate the line is unwound as the payload moves to the bottom of the swing may again be reduced or stopped, and the rate increased as the payload moves to the top of the right swing, and again reduced or stopped as the payload moves to the bottom of the swing. The process may be repeated for successive periods of oscillation. The rate of speed at which the winch line 602 is unwound may vary from one period of oscillation to the next as the distance of the payload 608 to the UAV 600 changes, and may even be varied within a single period of oscillation. For example, the rate of winding or unwinding may be proportional to the velocity of the payload or the velocity of the payload squared.

Furthermore, when there is large distance between the payload 608 and the UAV 600, the pendular motion of the payload may be very slow, on the order of ¼ hertz. At this point the amount of the winch line 602 unwound or wound onto the winch 604 during "pumping" may be on the order of meters. As the payload 608 gets closer to the UAV 600, the pendular motion may speed up to on the order of 1 hertz or more. In this case, the amount of the winch line unwound or wound onto the winch during "pumping" may be on the order of centimeters.

Figures 10A, 10B, 10C, 10D:
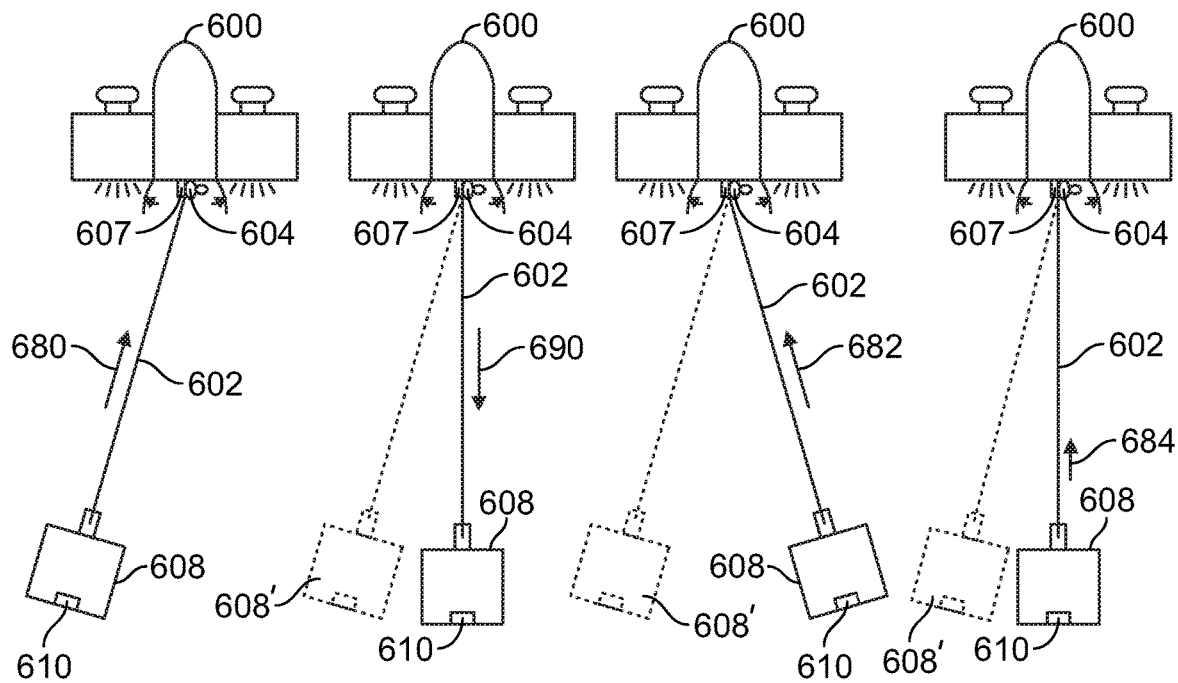
FIGS. 10A, 10B, 10C, and 10D are simplified illustrations of a UAV during ascent of the payload, according to an example embodiment.

FIGS. 10A-10D illustrate the pumping of the payload 608 during ascent to reduce or damp the oscillations of payload 608. As illustrated in FIG. 10B, at the bottom of the swing, the winch line 602 is unwound from winch 604 so that payload 608 descends in a direction indicated by arrow 690. As shown in FIG. 10A, as the payload moves the top of the swing to the left, the winch line 602 may be wound in a direction represented by the arrow 680. When the payload 608 moves towards the bottom of the swing (as shown in FIG. 10B), the winch line 602 may again be unwound from winch 604 so that payload 608 descends in a direction indicated by arrow 690. As shown in FIG. 10C, as the payload moves to the top of the swing to the right, the winch line 602 may be wound in a direction represented by the arrow 682. The payload 608 will then return to the bottom of the swing as shown in FIG. 10B, where the line may again be unwound during the return to the bottom of the swing.

As illustrated in FIGS. 10A-10C, during one period of oscillation, the direction that the winch line is wound in or unwound may be reversed on two separate occasions. The process may be repeated for successive periods of oscillation. The rate of speed at which the winch line 602 is wound in or unwound may vary from one period of oscillation to the next as the distance of the payload 608 to the UAV 600 changes, and may even be varied within a single period of oscillation. For example, the rate of line intake or outtake could be proportional to the velocity of the payload through a single period of oscillation, such that it matches or approximates a harmonic motion of the payload 608. As illustrated in FIG. 10D, rather than unwinding the winch line 602 as the payload moves to the bottom of the swing, the rate at which the winch line 602 is wound in may be reduced or stopped as the payload moves towards the bottom of the swing, as represented by the direction of arrow 684.

In this situation, during one period of oscillation, the rate at which the winch line 602 is wound in may be changed on two separate occasions. In particular, the rate may be reduced or stopped as the payload moves towards the bottom of the swing, increased as the payload moves to the top left swing, and again reduced or stopped as the payload moves to the bottom of the swing, and again increased as the payload moves to the top right of the swing. The process may be repeated for successive periods of oscillation. The rate of speed at which the winch line 602 is wound in may vary from one period of oscillation to the next as the distance of the payload 608 to the UAV 600 changes, and may even be varied within a single period of oscillation. For example, the rate of winding in line as the payload moves towards the top of the swing may be proportional to the velocity of the payload (or the velocity of the payload squared), and may thus continuously vary as the line is wound in.

The present methods of controlling the movement of the payload 608 advantageously do not require the addition of any new actuators (i.e., it uses the winch and braking system that is already required by the system), but provides an additional input for controlling the slung load compared to control systems that rely solely on translation or horizontal movement of the UAV 600 to control the payload.

By being able to "pump" the payload 608 like a swing, energy may be removed and the oscillation of the slung load damped without requiring any translation or movement of the UAV 600. This makes control of the UAV 600 easier, less energy intensive and less destabilizing to normal flight dynamics. In some embodiments, as control of the slung load may use a combination of aerial vehicle translation and winching/unwinching of the winch line. For example, as shown in FIG. 11, the UAV may be moved or translated in the direction of arrows 620 and 622, while at the same time the winch 604 is used to wind in the winch line 602 in the direction of arrow 630 or unwind the winch line 602 in the direction of arrow 632. However, where winch control alone is used to control the payload 608, less horizontal movement of the UAV 600 may be achieved which may be an important feature if delivery is to take place in tight quarters, such as in a backyard of a home.

FIGS. 14A-D illustrate the primary forces acting on payload 608 during a period of oscillation (excluding wind and drag forces). In particular, as shown in FIG. 14A, when the payload 608 is positioned beneath the UAV 600, the tension force T from the line 602 balances the gravitational force g acting on the mass m of the payload 608. Thus, T=mg when the when the payload 608 is positioned directly beneath the UAV 600. FIG. 14B illustrates payload 608 at an angular displacement θ from the bottom of the swing shown in FIG. 14A. In this case, the component mgcosθ of the gravitational force mg is equal the tension force T from line 602. However, there is a restoring force acting on payload 608 equal to mgsinθ and exerting a force back to the equilibrium at the bottom of the swing. The restoring force is proportional to the sine of the angular displacement, sin θ.

In order to damp the pendular motion of the payload 608, it may be desirable to wind in line 602 when the payload is moving in direction of arrow 700 toward the top of the swing. However, when the payload 608 is moving in the direction of arrow 710 after reaching the top of the swing, further winding in of the line may increase the force acting on the payload towards equilibrium at the bottom of the swing. Therefore, damping of the oscillations of the pendular motion of the payload 608 may advantageously be provided by winding the line 602 as the payload 608 moves from the bottom of the swing in a direction of arrow 700 towards the top of the swing, and unwinding the line 602 as the payload 608 moves from the top of the swing in a direction of arrow 710 to the bottom of the swing.

FIG. 14C illustrates where payload 608 has returned to the bottom of the swing and force T=mg. FIG. 14D illustrates payload 608 at an angular displacement θ from the bottom of the swing shown in FIG. 14B to the right. In this case, the component mgcosθ of the gravitational force mg is equal the tension force T from line 602. However, there is a restoring force acting on payload 608 equal to mgsinθ and exerting a force back to the equilibrium at the bottom of the swing.

In order to damp the pendular motion of the payload 608, it may be desirable to wind in line 602 when the payload is moving in direction of arrow 720 toward the top of the swing. However, when the payload 608 is moving in the direction of arrow 730 after reaching the top of the swing, further winding in of the line may increase the force acting on the payload towards equilibrium at the bottom of the swing. Therefore, damping of the oscillations of the pendular motion of the payload 608 may advantageously be provided by winding the line 602 as the payload 608 moves from the bottom of the swing in a direction of arrow 720 towards the top of the swing, and unwinding the line 602 as the payload 608 moves from the top of the swing in a direction of arrow 730 to the bottom of the swing.

VII. EXAMPLE METHODS OF CONTROLLING A SLUNG LOAD

Figure 12:
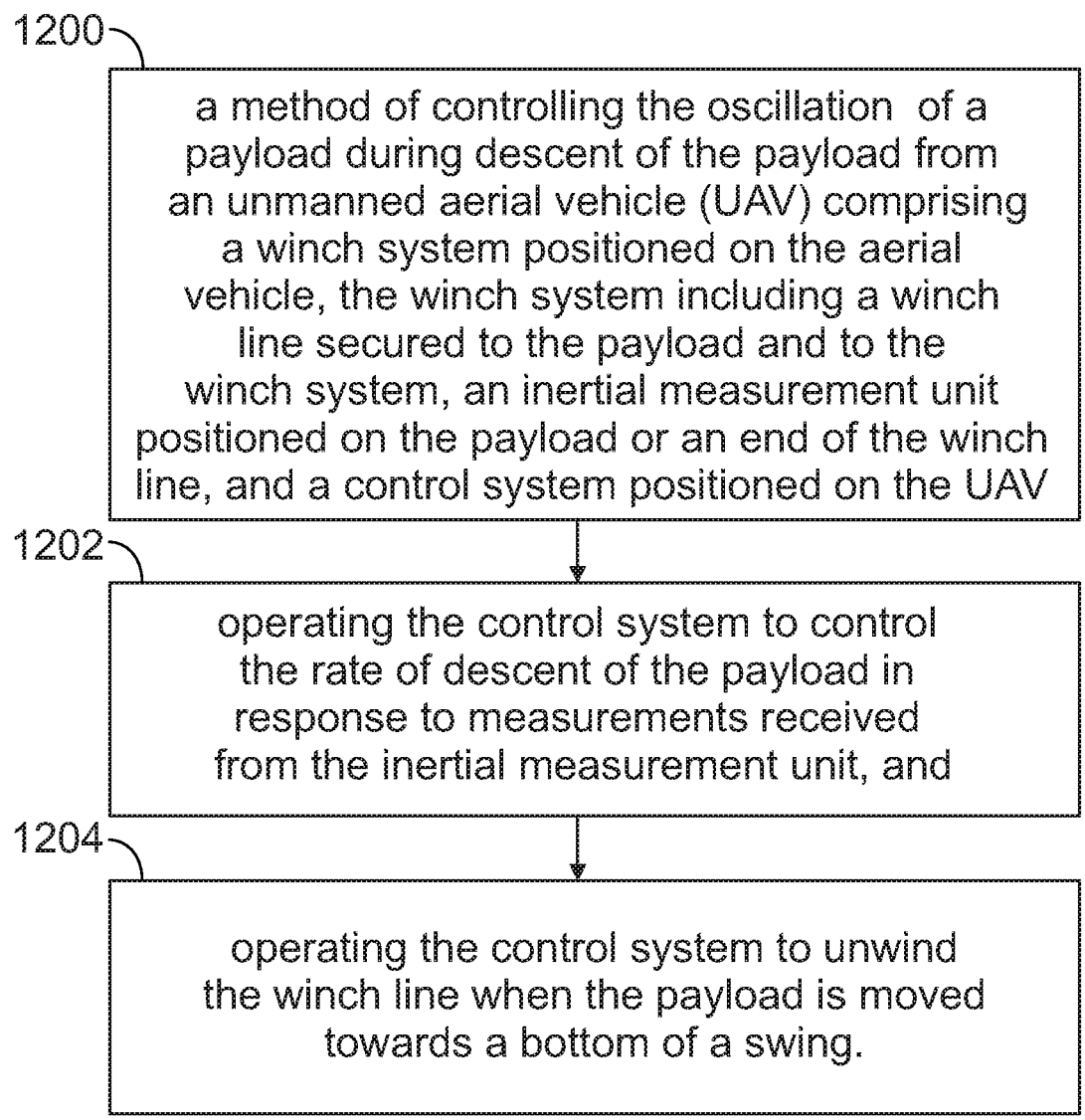
FIG. 12 is a method, according to an example embodiment.

FIG. 12 illustrates a method 1200 of controlling the oscillation of a payload during descent of the payload from an unmanned aerial vehicle (UAV) comprising a winch system positioned on the aerial vehicle, the winch system including a winch line secured to the payload and to the winch system, an inertial measurement unit positioned on the payload or an end of the winch line, and a control system positioned on the UAV. Method 1200 includes the step 1202 of operating the control system to control the rate of descent of the payload in response to measurements received from the inertial measurement unit, and step 1204 of operating the control system to unwind the winch line when the payload is moved towards a bottom of a swing.

Figure 13:
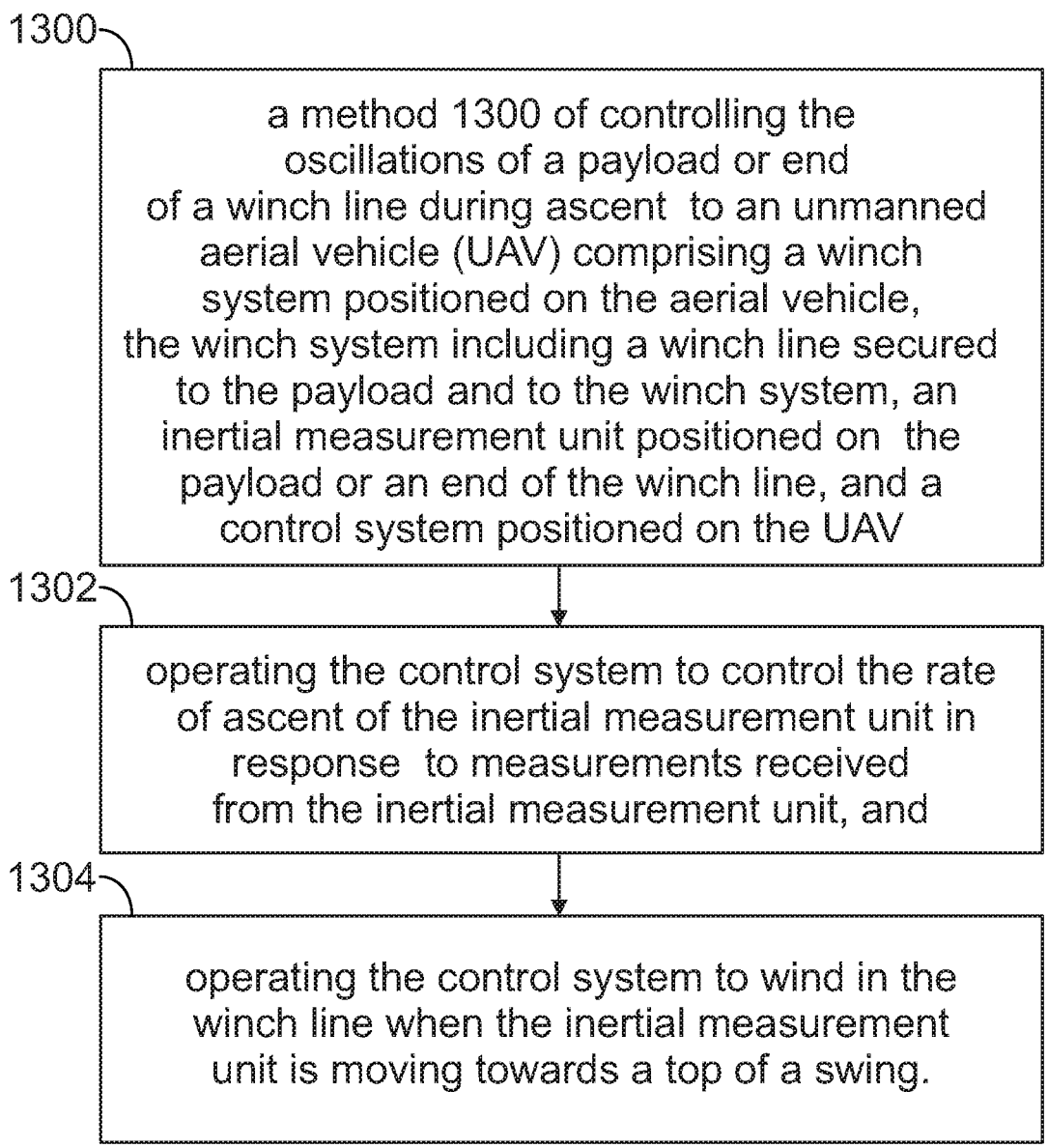
FIG. 13 is a method, according to an example embodiment.

FIG. 13 illustrates a method 1300 of controlling the oscillations of a payload or end of a winch line during ascent to an unmanned aerial vehicle (UAV) comprising a winch system positioned on the aerial vehicle, the winch system including a winch line secured to the payload and to the winch system, an inertial measurement unit positioned on the payload or an end of the winch line, and a control system positioned on the UAV. Method 1300 includes the step 1302 of operating the control system to control the rate of ascent of the inertial measurement unit in response to measurements received from the inertial measurement unit, and the step 1304 of operating the control system to wind in the winch line when the inertial measurement unit is moving towards a top of a swing.

VIII. CONCLUSION

It should be understood that the systems as described above can be implemented in the form of or include program logic (i.e., program instructions) that is stored on a non-transitory computer readable medium. For instance, example systems may take the form computer software, hardware, and/or firmware, or may include such software, hardware, and/or firmware in a modular or integrated manner. Based on the disclosure and teachings provided herein, a person of ordinary skill in the art can know and appreciate other ways and/or methods using hardware, firmware, and/or software.

Further, where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method of controlling oscillations of a payload during ascent to an unmanned aerial vehicle (UAV) comprising a winch system positioned on the aerial vehicle, the winch system including a winch line secured to the payload and to the winch system, and a control system positioned on the UAV, comprising the steps of:
  operating the control system to control the rate of ascent of the payload in response to measurements received relating to the oscillations of the payload; and
  operating the control system to wind in the winch line when the payload moves from a bottom of a swing toward a top of the swing;
  wherein the winch system is controllable to vary the rate of ascent of the payload; and
  the control system is configured to control the oscillations of the payload during ascent by operating the winch system to control the rate of ascent of the payload in response to measurements received relating to the oscillation of the payload.

2. The method of claim 1, wherein the control system is further configured to control oscillations of the payload during ascent by unwinding the winch line when the payload moves towards the bottom of the swing.

3. The method of claim 1, wherein the control system is further configured to control oscillations of the payload during ascent by reducing or stopping the rate the winch line is wound in when the payload moves towards the bottom of the swing.

4. The method of claim 1, wherein a period of oscillation of the payload is determined during ascent of the payload.

5. The method of claim 4, wherein the control system is configured to wind in the winch line at a first rate at a first pair of separate points during the period of oscillation of the payload during ascent of the payload, and wind in the winch line at a second lower rate at a second pair of separate points during the period of oscillation of the payload during ascent of the payload.

6. The method of claim 1, wherein the control system is configured to wind in the winch line at a rate proportional to a velocity of the payload as the payload moves from the bottom of a swing towards the top of the swing.

7. The method of claim 1, wherein the control system is configured to unwind the winch line at two separate points during a period of oscillation of the payload.

8. The method of claim 1, wherein the control system is further configured to control oscillations of the payload by translating the position of the UAV in response to measurements received regarding oscillations of the payload during ascent of the payload.

9. The method of claim 1, wherein the control system is configured to reverse the direction of winch line travel twice during a period of oscillation of the payload.

* * * * *